(12) United States Patent
Wang et al.

(10) Patent No.: US 9,415,797 B2
(45) Date of Patent: Aug. 16, 2016

(54) AUTOMOBILE ACTIVE STEERING SYSTEM WITH CYCLOIDAL-PIN WHEEL MECHANISM

(71) Applicant: JILIN UNIVERSITY, Changchun (CN)

(72) Inventors: Junnian Wang, Changchun (CN); Yishan Pan, Shanghai (CN); Qingnian Wang, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 14/720,835

(22) Filed: May 25, 2015

(65) Prior Publication Data

US 2016/0031475 A1 Feb. 4, 2016

(30) Foreign Application Priority Data

Jul. 29, 2014 (CN) .......................... 2014 1 0367147

(51) Int. Cl.
*B62D 5/00* (2006.01)
(52) U.S. Cl.
CPC ...................................... *B62D 5/008* (2013.01)
(58) Field of Classification Search
CPC .................................................. B62D 5/0403
See application file for complete search history.

(56) References Cited

U.S. PATENT DOCUMENTS

| | | | | |
|---|---|---|---|---|
| 3,574,489 A | * | 4/1971 | Pierrat | F01C 1/103 418/171 |
| 8,886,381 B2 | * | 11/2014 | Ozaki | B60L 15/20 180/65.1 |
| 2006/0213320 A1 | * | 9/2006 | Menjak | B62D 5/008 74/640 |
| 2013/0342150 A1 | * | 12/2013 | Ozaki | B60L 3/0061 318/490 |

* cited by examiner

*Primary Examiner* — Kevin Hurley
(74) *Attorney, Agent, or Firm* — Platinum Intellectual Property LLP

(57) ABSTRACT

The invention discloses an automobile active steering system with a cycloidal-pin wheel mechanism, and aims at overcoming the contraction between light steering effort and flexibility. The automobile active steering system comprises a steering hand wheel (47), a steering shaft (52), a steering transmission shaft (48), a cycloidal-pin wheel type transmission mechanism (49), a rotary hydraulic valve (50), and a steering box (51). The steering hand wheel (47) is connected with an upper end of the steering shaft (52) by use of a spline pair, a lower end of the steering shaft (52) is connected with an upper end of the steering transmission shaft (48) by use of a universal joint, a lower end of the steering transmission shaft (48) is connected with a right end of an input shaft (21) of the cycloidal-pin wheel type transmission mechanism (49) by use of a universal joint.

18 Claims, 11 Drawing Sheets

AUTOMOBILE ACTIVE STEERING SYSTEM WITH CYCLOIDAL-PIN WHEEL MECHANISM

CROSS-REFERENCE TO RELATED APPLICATION

This application claims the priority benefit of Chinese patent application No. 201410367147.4, filed Jul. 29, 2014. The entirety of the above-mentioned patent application is hereby incorporated by reference herein and made a part of specification.

FIELD OF THE INVENTION

The present invention relates to an automobile active steering system, and particularly to an automobile active steering system with a cycloidal-pin wheel mechanism.

BACKGROUND ART

An automobile steering system plays a key role in automobile running safety and driving experience. In a conventional automobile steering system, the transmission ratio is usually a fixed value, that is to say, the transmission ratio of the steering system can not be changed during operation. A contraction exists between light steering effort and flexibility. Namely, in case the torque transmission ratio is increased, the steering effort will become lighter, while the angle transmission ratio will also become larger, indicating the steering is not sensitive. In the conventional automobile steering system, a relatively suitable transmission ratio with fixed value is the result of a compromise. Although there are steering boxbox with variable transmission ratios, e.g., a rack and pinion steering boxbox with variable tooth pitch, rack with recirculation ball and gear sector-type steering boxbox with a variable sector engagement radius, their transmission ratios can be designed to vary in a certain range. However, this certain range is not large, and these steering boxboxes are difficult to process.

The problems mentioned above can be solved by a recent automobile steering system in which the front wheel can steer actively. By adding a set of planet reducing mechanism to a steering column, e.g., in AFS system which has been developed jointly by BMW and ZF Friedrichshafen AG, an input freedom is provided by a planet gear mechanical structure, so as to provide additional steering by an electric servo motor. The Audi Dynamic Steering system has been developed by Audi, which has a variable steering ratio, is capable of varying the steering ratio in a certain range continuously by a harmonic gear set, and can magnify or downscale a steering action of a driver in a certain range. Another active steering system is a drive-by-wire steering system (SWB), in which the driver's steering angle input and the instant automobile status are considered by a controller to determine the output current of the steering motor for driving the front wheels. In the drive-by-wire steering system, the mechanical connection between the steering hand wheel and the steering boxbox is eliminated, reducing the safety. In the AFS system of BMW or the Dynamic Steering system of Audi, while an input freedom is added to the steering system, the mechanical connection between the steering hand wheel and the steering boxbox is still maintained, which not only conforms to the current regulations about automobiles, but also improves reliability of the system.

SUMMARY

It is an object of the present invention to overcome the contraction between light steering effort and flexibility, by providing an automobile active steering system with a cycloidal-pin wheel mechanism which has a variable transmission ratio.

The present invention provides the following technical solutions.

An automobile active steering system with a cycloidal-pin wheel mechanism comprises a steering hand wheel, a steering shaft, a No. 1 universal joint, a steering transmission shaft, a No. 2 universal joint, a cycloidal-pin wheel type transmission mechanism, a rotary hydraulic valve, and a steering boxbox;

the steering hand wheel is connected with an upper end of the steering shaft by use of a spline pair, a lower end of the steering shaft is connected with an upper end of the steering transmission shaft by use of the No. 1 universal joint, the other end of the steering transmission shaft is connected with a right end of an input shaft in the cycloidal-pin wheel type transmission mechanism by use of the No. 2 universal joint, a No. 3 gear of the cycloidal-pin wheel type transmission mechanism is connected with a right end of the steering pinion shaft of the rotary hydraulic valve by use of a spline pair, and a steering pinion of the steering pinion shaft is engaged with a rack part of the steering box.

Preferably, the steering hand wheel (47) is a three-spoke or four-spoke steering wheel; the steering transmission shaft (48) comprises a tube with internal splines and a shaft with external splines which are assembled together, and the tube with internal splines and the shaft with external splines are connected in a sliding manner;

the rotary hydraulic valve (50) comprises a valve body (2) and a steering pinion part, and the steering pinion part comprises the steering pinion shaft (1);

an upper end of the valve body (2) is provided with a pinion shaft bore (2a) for installing the steering pinion shaft (1); a lower end of the valve body (2) is provided with a bearing bore (2b) for installing a No. 7 bearing (44), a left end of the bearing bore (2b) is provided with a threaded bore (2c) for installing a No. 3 bearing end cover (45), a revolving axis of the bearing bore (2b) for installing the No. 7 bearing (44) is collinear with that of the threaded bore (2c) for installing the No. 3 bearing end cover (45), a revolving axis of the pinion shaft bore (2a) is parallel with that of the bearing bore (2b) for installing the No. 7 bearing, three bores (2e) of the same structure for installing bolts are uniformly arranged in a left end face of the valve body (2), three bolt bores (2d) of the same structure for installing bolts are uniformly arranged in a right end face of the valve body (2), and the steering pinion shaft (1) is installed to and rotationally connected with the pinion shaft bore (2a) at an upper end of the valve body (2).

Preferably, the cycloidal-pin wheel type transmission mechanism (49) comprises an input part, a servo motor part, an intermediate shaft part, an eccentric shaft part, a pin gear ring part, an output part, a shell part, and an electromagnetic clutch (31);

the shell part comprises the valve body (2), a lower shell (4), an intermediate shell (11), an upper shell (16), an upper cover (19), a No. 1 bearing end cover (20), a No. 2 bearing end cover (25), and a No. 3 bearing end cover (45);

the valve body (2), the lower shell (4), the intermediate shell (11), the upper shell (16), and the upper cover (19) are successively connected and fastened by bolts, the No. 1 bearing end cover (20) is connected with a thread of an upper threaded bore (19d) of the upper cover (19), the No. 2 bearing end cover (25) is connected with a thread of a lower threaded bore (19a) of the upper cover (19), the No. 3 bearing end cover (45) is connected with a thread of the threaded bore (2c) of the valve body (2);

the input shaft (21) of the input part is installed to a bearing bore (16g) at an upper end of the upper shell (16) and an upper bearing bore (19e) at an upper end of the upper cover (19) by use of two No. 2 bearings (22) of the same structure, an intermediate shaft (26) of the intermediate shaft part is installed to a bearing bore (16b) at an intermediate position of the upper shell (16) and a lower bearing bore (19b) of the upper cover (19) by use of two No. 3 bearings (24) of the same structure, the servo motor part is installed to a right end face of a rear upper bore (19g) of the upper cover (19) by use of a shell in a servo motor (28), a No. 5 gear (30) of the servo motor part is engaged with a No. 6 gear (23) of the intermediate shaft part, the pin gear ring part is installed to a bearing bore (11d) of the intermediate shell (11) by use of a pin gear rack hollow shaft (14) in the pin gear ring part and two No. 1 bearings (9) of the same structure, a No. 2 gear (33) which is installed to a right end of the pin gear rack hollow shaft (14) is engaged with a No. 1 gear (12) of the input part, a No. 1 bearing bore (14b) and a No. 2 bearing bore (14g) are installed to the pin gear rack hollow shaft (14) by use of an eccentric shaft (18) in the eccentric shaft part and two No. 4 bearings (32) of the same structure and are rotationally connected with each other, the output part is installed to a bearing bore (4e) of the lower shell (4) and a bearing bore (2b) at a lower end of the valve body (2) by use of an output mechanism support shaft (46) in the output part, a No. 6 bearing (40), and a No. 7 bearing (44), the output mechanism support shaft (46) is engaged with a cylindrical pin (38) and a cycloidal wheel (39) of the eccentric shaft part by use of a cylindrical pin sleeve (37), the electromagnetic clutch (31) is connected between the eccentric shaft (18) of the eccentric shaft part and the intermediate shaft (26) of the intermediate shaft part, a steering pinion shaft part is installed to the pinion shaft bore (2a) at an upper end of the valve body (2) by use of the steering pinion shaft (1) and is rotationally connected with the pinion shaft bore (2a), and the No. 3 gear (3) and a No. 4 gear (41) of the output part are engaged with each other;

the eccentric shaft (18) is a rod-type structural member, the eccentric shaft (18) comprises a right section shaft, a No. 1 shaft neck (18a), a middle unthreaded shaft, a No. 2 shaft neck (18b), and an eccentric unthreaded shaft neck (18c) which are successively and integrally connected, a left end of the eccentric unthreaded shaft neck (18c) is provided with a stopping slot, revolving axes of the right section shaft, the No. 1 shaft neck (18a), the middle unthreaded shaft, and the No. 2 shaft neck (18b) are collinear with each other, a revolving axis of the eccentric unthreaded shaft neck (18c) is parallel with that of the No. 2 shaft neck (18b), and an eccentric distance between revolving axes of the eccentric unthreaded shaft neck and the No. 2 shaft neck is 1 mm.

Preferably, the pin gear rack hollow shaft (14) is a rotary body comprising a flange plate at a left end and a cylinder at a right end which are integrally assembled, revolving axes of the flange plate and the cylinder are collinear with each other, twenty-six pin gear bores (14f) of the same structure are uniformly arranged in the flange plate for installing pin gears (8), two No. 1 unthreaded shaft necks (14d) of the same structure and a spline shaft section are successively arranged on a cylinder outer circumferential face at a right side of the flange plate, a No. 1 groove (14e) is arranged between two No. 1 unthreaded shaft necks (14d) of the same structure, a shoulder is arranged at a left end of the No. 1 shaft neck (14d) at a left end, a No. 2 groove (14c) is arranged at a right end of the spline shaft section; a stepped bore is arranged at a center of the cylinder, the No. 1 bearing bore (14b), a middle unthreaded bore, and the No. 2 bearing bore (14g) are arranged successively from right to left; the No. 1 bearing bore (14b) and the No. 2 bearing bore (14g) are of the same diameter, a groove (14a) is arranged in a right inner wall of the No. 1 bearing bore (14b), the middle unthreaded bore has a diameter larger than that of the No. 1 bearing bore (14b) and the No. 2 bearing bore (14g), and an in-bore positioning convex shoulder is arranged at a left end of the No. 2 bearing bore (14g).

Preferably, the pin gear ring part further comprises a supporting ring (7), twenty-six pin gears (8) of the same structure, a No. 1 elastic collar for shaft (15), and a No. 2 elastic collar for shaft (34);

the pin gear (8) comprises a left small-diameter section and a right large-diameter section, the right large-diameter section is an unthreaded shaft, a left section of the left small-diameter section is provided with external threads, a right section of the left small-diameter section is an unthreaded shaft neck, and a chamfer is arranged between the left small-diameter section and the right large-diameter section;

large end unthreaded shafts of twenty-six pin gears (8) of the same structure are successively installed to twenty-six pin gear bores (14f) which are uniformly arranged on a large disc end of the pin gear rack hollow shaft (14) by use of interference fit, twenty-six bores in the supporting ring (7) which are aligned with twenty-six pin gear bores (14f) in the large disc end are assembled to small end unthreaded shaft necks at a left section of twenty-six pin gears (8), respectively, a right end face of the supporting ring (7) is connected to contact the chamfer between small end shaft necks at a left section of twenty-six pin gears (8) of the same structure and large end shaft necks of the pin gears (8), thirteen nuts of the same structure are alternately installed to a small end of thirteen pin gears (8) among the twenty-six pin gears (8) of the same structure by use of threads, the No. 1 bearing (9) at a left side is assembled to a left side of the No. 1 shaft neck (14d) of the pin gear rack hollow shaft (14), a left end face at an inner ring of the No. 1 bearing (9) at a left side is connected to contact a right end face of a left side shoulder of the No. 1 shaft neck (14d), the No. 2 elastic collar for shaft (34) is assembled to the No. 1 groove (14e) of the pin gear rack hollow shaft (14), the No. 1 bearing (9) at a right side is assembled to a right end the No. 1 shaft neck (14d) of the pin gear rack hollow shaft (14), the No. 2 gear (33) is assembled to an involute spline shaft of the pin gear rack hollow shaft (14), the No. 1 elastic collar for shaft (15) is installed to the No. 2 groove (14c) of the pin gear rack hollow shaft (14) at a right side of the No. 2 gear (33), and the No. 2 elastic collar for shaft (34) is assembled to the No. 1 groove (14e) of the pin gear rack hollow shaft (14).

Preferably, the output part further comprises eight cylindrical pin sleeves (37) of the same structure, eight cylindrical pins (38) of the same structure, the No. 6 bearing (40), the No. 4 gear (41), the No. 3 gear (3), a No. 1 shaft end collar (5), a No. 1 screw (58), a No. 2 socket (43), the No. 7 bearing (44), and the output mechanism support shaft (46);

left ends of eight cylindrical pins (38) of the same structure are successively installed to eight cylindrical pin bores (46a) which are uniformly arranged in the flange plate at a large end of the output mechanism support shaft (46) by use of interference fit, eight cylindrical pin sleeves (37) of the same structure are successively assembled to eight cylindrical pins (38) of the same structure by use of clearance fit, the No. 6 bearing (40) is assembled to the No. 1 shaft neck (46b) of the output mechanism support shaft (46) by use of interference fit, a right end face at an inner ring of the No. 6 bearing (40) is connected to contact a shoulder at a right side of the No. 1 shaft neck (46b) of the output mechanism support shaft (46), a left end face at an outer ring of the No. 6 bearing (40) is connected to contact a right end face of an inner flange of the bearing bore (4e) of the lower shell (4), the No. 4 gear (41) is assembled to the spline shaft of the output mechanism support shaft (46) by use of a spline pair, the No. 2 socket (43) is assembled to the spline shaft at a left side of the No. 4 gear (41) bu use of clearance fit, a right end face of the No. 4 gear (41) contacts the spline groove end face of the involute spline shaft, a right end face of the No. 2 socket (43) is connected to contact a left end face of the No. 4 gear (41), the No. 7 bearing (44) is assembled to the No. 2 shaft neck (46c) of the output mechanism support shaft (46), a right end face at an inner ring of the No. 7 bearing (44) is connected to contact a left end face if the No. 2 socket (43), and a left end face at an outer ring of the No. 7 bearing (44) is connected to contact a right end face of the No. 3 bearing end cover (45).

An automobile active steering system with a cycloidal-pin wheel mechanism comprises:

a steering hand wheel;

a steering transmission mechanism, which is connected with the steering hand wheel for transmitting a steering angle of the steering hand wheel;

a servo motor driving mechanism, which is capable of providing an additional steering angle; and a cycloidal-pin wheel mechanism, which is capable of receiving the steering angle transmitted by the steering transmission mechanism and the additional steering angle provided by the servo motor driving mechanism, so that the steering angle transmitted by the steering transmission mechanism and the additional steering angle provided by the servo motor driving mechanism are superimposed and then output;

a clutch, which selectively connects the servo motor driving mechanism with the cycloidal-pin wheel mechanism.

Preferably, the steering transmission mechanism comprises a steering shaft, a No. 1 universal joint, a steering transmission shaft, a No. 2 universal joint which are successively connected, wherein the No. 2 universal joint is connected with an input shaft of the cycloidal-pin wheel type transmission mechanism;

the steering transmission shaft comprises a tube and a shaft sleeve which are engaged by spline and are slidable with respect to each other to modify a length of the steering transmission shaft.

Preferably, the cycloidal-pin wheel type transmission mechanism further comprises:

an input shaft, which is connected with the steering driving mechanism and receives the steering angle output by the steering wheel;

a cycloidal-pin wheel reducer, which is connected with the input shaft, receives the steering angle transmitted by the input shaft, and outputs the steering angle;

wherein the clutch is arranged between the servo motor driving mechanism and the cycloidal-pin wheel reducer, and the clutch selectively transmits the steering angle output by the servo motor driving mechanism to the cycloidal-pin wheel reducer.

Preferably, the servo motor driving mechanism comprises:

a servo motor;

a No. 5 gear which is connected with the servo motor, wherein revolving axes of the No. 5 gear and the servo motor are coaxial;

an intermediate shaft and a No. 6 gear, wherein revolving axes of the intermediate shaft and the No. 6 gear are coaxial, and the No. 5 gear is engaged with the No. 6 gear to transmit the steering angle output by the servo motor to the intermediate shaft.

Preferably, the cycloidal-pin wheel reducer comprises:

an eccentric shaft;

a cycloidal wheel, which is connected with an end of the eccentric shaft in a coaxial manner, wherein the cycloidal wheel is driven by the eccentric shaft to rotate eccentrically, and the cycloidal wheel is provided with cylindrical pin bores;

a pin gear rack hollow shaft, which is of a hollow configuration;

pin gears, which are arranged on the pin gear rack hollow shaft in a circular manner, wherein the cycloidal wheel is engaged with the pin gears;

an output mechanism support shaft, which is provided with cylindrical pins and cylindrical pin sleeves, wherein the cylindrical pins and cylindrical pin sleeves are engaged with the cylindrical pin bores, and the cycloidal wheel eccentric rotates to drive the output mechanism support shaft to rotate around its axis;

wherein the pin gear rack hollow shaft is connected with the input shaft, receives the steering angle output by the input shaft, and transmits the steering angle to the output mechanism support shaft;

the eccentric shaft can receive the steering angle transmitted by the servo motor driving mechanism via the clutch and transmit the steering angle to the output mechanism support shaft.

Preferably, the pin gear rack hollow shaft and the input shaft are driven by use of a pair of No. 1 gear and No. 2 gear which are engaged with each other, the No. 1 gear and the input shaft are connected in a coaxial manner, and the No. 2 gear and the pin gear rack hollow shaft are connected in a coaxial manner.

Preferably, the automobile active steering system further comprises a rotary hydraulic valve and a steering box, wherein the rotary hydraulic valve is installed between the cycloidal-pin wheel reducer and the steering box, so that the cycloidal-pin wheel reducer transmits the steering angle output by the output mechanism support shaft to the steering box for steering wheels;

the rotary hydraulic valve comprises:

a valve body;

a steering pinion shaft, which is provided with four bosses, wherein the bosses are provided with an angular groove, a valve pocket gasket is installed in the angular groove, and once the steering pinion shaft is inserted into the valve body, the valve pocket gasket is compressed to deform and closely fit to a valve body inner wall to provide sealing;

a torsion bar, which is inserted into an axial empty chamber of the steering pinion shaft, and is fastened to the steering pinion shaft by use of valve pocket positioning pins;

a spool, which is fastened to the torsion bar by use of a spool positioning pin;

wherein the spool and the output mechanism support shaft are driven by a pair of No. 3 gear and No. 4 gear which are engaged with each other, wherein the No. 3 gear and the spool are connected in a coaxial manner, and the No. 4 gear and the output mechanism support shaft are connected in a coaxial manner;

the steering pinion shaft is provided with tooth shaped sections, wherein the steering box comprises a steering box rack, and tooth shaped sections of the pinion shaft are engaged with the steering box rack to drive the steering box rack to move to left and/or right, thus steering the wheels.

An automobile active steering system with a cycloidal-pin wheel mechanism comprises:

a steering wheel;

a steering driving mechanism, which is connected with the steering hand wheel for transmitting a steering angle of the steering wheel; and a cycloidal-pin wheel type transmission mechanism, which is connected with the steering driving mechanism, and receives the steering angle transmitted by the steering driving mechanism;

a steering box, which is connected with the cycloidal-pin wheel type transmission mechanism, receives the steering angle output by the cycloidal-pin wheel type transmission mechanism, and steers the wheels;

wherein the cycloidal-pin wheel type transmission mechanism is further capable of applying an additional steering angle, and the additional steering angle is superimposed on the steering angle transmitted by the steering driving mechanism for outputting.

Preferably, the steering driving mechanism comprises a steering shaft, a No. 1 universal joint, a steering transmission shaft, a No. 2 universal joint which are successively connected, wherein the No. 2 universal joint is connected with an input shaft of the cycloidal-pin wheel type transmission mechanism;

the steering transmission shaft comprises a tube and a shaft sleeve which are engaged by spline and are slidable with respect to each other to modify a length of the steering transmission shaft.

Preferably, the cycloidal-pin wheel type transmission mechanism comprises:

an input shaft, which is connected with the steering driving mechanism and receives the steering angle output by the steering wheel;

a servo motor driving mechanism, which is capable of providing an additional steering angle;

a cycloidal-pin wheel reducer, which is connected with the input shaft, receives the steering angle transmitted by the input shaft, and outputs the steering angle;

a clutch, which is arranged between the servo motor driving mechanism and the cycloidal-pin wheel reducer, wherein the clutch selectively transmits the steering angle output by the servo motor driving mechanism to the cycloidal-pin wheel reducer.

Preferably, the servo motor driving mechanism comprises:
a servo motor;
a No. 5 gear which is connected with the servo motor, wherein revolving axes of the No. 5 gear and the servo motor are coaxial;
an intermediate shaft and a No. 6 gear, wherein the intermediate shaft and the No. 6 gear are connected in a coaxial manner, and the No. 5 gear is engaged with the No. 6 gear to transmit the steering angle output by the servo motor to the intermediate shaft.

Preferably, the cycloidal-pin wheel reducer comprises:
an eccentric shaft;
a cycloidal wheel, which is connected with an end of the eccentric shaft in a coaxial manner, wherein the cycloidal wheel is driven by the eccentric shaft to rotate eccentrically, and the cycloidal wheel is provided with cylindrical pin bores;
a pin gear rack hollow shaft, which is of a hollow configuration;
pin gears, which are arranged on the pin gear rack hollow shaft in a circular manner, wherein the cycloidal wheel is engaged with the pin gears;
an output mechanism support shaft, which is provided with cylindrical pins and cylindrical pin sleeves, wherein the cylindrical pins and cylindrical pin sleeves are engaged with the cylindrical pin bores, and the cycloidal wheel eccentric rotates to drive the output mechanism support shaft to rotate around its axis;

wherein the pin gear rack hollow shaft is connected with the input shaft, receives the steering angle output by the input shaft, and transmits the steering angle to the output mechanism support shaft;

the eccentric shaft can receive the steering angle transmitted by the servo motor driving mechanism via the clutch and transmit the steering angle to the output mechanism support shaft.

Preferably, the pin gear rack hollow shaft and the input shaft are driven by use of a pair of No. 1 gear and No. 2 gear which are engaged with each other, the No. 1 gear and the input shaft are connected in a coaxial manner, and the No. 2 gear and the pin gear rack hollow shaft are connected in a coaxial manner.

Preferably, the automobile active steering system further comprises a rotary hydraulic valve, wherein the rotary hydraulic valve is installed between the cycloidal-pin wheel reducer and the steering box, so that the cycloidal-pin wheel reducer transmits the steering angle output by the output mechanism support shaft to the steering box for steering wheels;

the rotary hydraulic valve comprises:
a valve body;
a steering pinion shaft, which is provided with four bosses, the bosses are provided with an angular groove, a valve pocket gasket is installed in the angular groove, and once the steering pinion shaft is inserted into the valve body, the valve pocket gasket is compressed to deform and closely fit to a valve body inner wall to provide sealing;
a torsion bar, which is inserted into an axial empty chamber of the steering pinion shaft, and is fastened to the steering pinion shaft by use of valve pocket positioning pins;
a spool, which is fastened to the torsion bar by use of a spool positioning pin;
wherein the spool and the output mechanism support shaft are driven by a pair of No. 3 gear and No. 4 gear which are engaged with each other, wherein the No. 3 gear and the spool are connected in a coaxial manner, and the No. 4 gear and the output mechanism support shaft are connected in a coaxial manner;
the steering pinion shaft is provided with tooth shaped sections, wherein the steering box comprises a steering box rack, and tooth shaped sections of the pinion shaft are engaged with the steering box rack to drive the steering box rack to move to left and/or right, thus steering the wheels.

The present invention has the following beneficial effects over the prior art.

1. The automobile active steering system is compatible with various steering boxes to enable active steering. When the automobile is running at a low speed, an angle transmission ratio of the steering system is reduced, so as to reduce the range of steering angle of the steering wheels in case of steering by a large angle at the low speed and to improve flexibility during turning at the low speed. When the automobile is running at a high speed, the angle transmission ratio of the steering system is increased, so as to reduce sensitivity of the steering hand wheel and to improve running stability at the high speed.

2. In case the hydraulic power assisted steering box is applied in the automobile active steering system, the rotary hydraulic valve is installed between the cycloidal-pin wheel type transmission mechanism and the steering box, so that the motor can drive the rotary hydraulic valve via the cycloidal-pin wheel type transmission mechanism, and the hydraulic power assisted steering box can produce a corresponding assisting effect.

3. The automobile active steering system adopts a cycloidal-pin wheel type transmission mechanism, and has a rather wide selection range of transmission ratio. The transmission ratio of a single stage lies in a range from 6 to 119, facilitating selection of a motor and matching with the whole automobile.

4. The automobile active steering system adopts a cycloidal-pin wheel type transmission mechanism, and mechanical connections between the steering hand wheel and the steering box are maintained, thus providing a higher reliability over the drive-by-wire steering system.

5. The automobile active steering system adopts a cycloidal-pin wheel type transmission mechanism, so that the system has a long lifetime, because rolling friction is present among transmission members of the cycloidal-pin wheel, and the friction is small.

6. The automobile active steering system can further be compatible with various electric power assisted steering, and its arrangement is not restricted by the type of electric power assisted steering.

Figure 1:
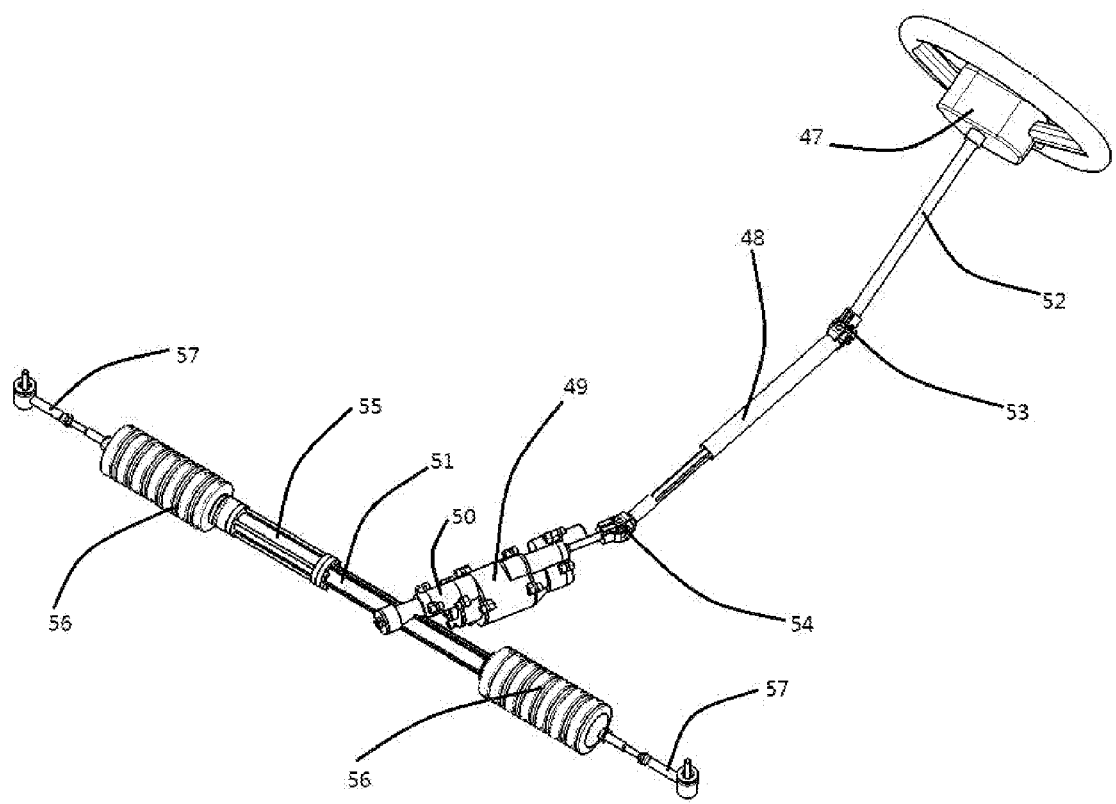
FIG. 1 is an axonometric projection illustrating an automobile active steering system with a cycloidal-pin wheel mechanism in the present invention.

Reference numerals appearing in drawings comprise: 1 steering pinion shaft, 2 valve body, 3 No. 3 gear, 4 lower shell, 5 No. 1 shaft end collar, 6 nut, 7 supporting ring, 8 pin gear, 9 No. 1 bearing, 10 No. 2 shaft end collar, 11 intermediate shell, 12 No. 1 gear, 13 No. 1 elastic collar for bore, 14 pin gear rack hollow shaft, 15 No. 1 elastic collar for shaft, 16 upper shell, 17 No. 2 elastic collar for bore, 18 eccentric shaft, 19 upper cover, 120 No. 1 bearing end cover, 21 input shaft, 22 No. 2 bearing, 23 No. 6 gear, 24 No. 3 bearing, 25 No. 2 bearing end cover, 26 intermediate shaft, 27 No. 1 socket, 28 servo motor, 29 No. 1 internal hexagon socket head bolt, 30 No. 5 gear, 31 electromagnetic clutch, 32 No. 4 bearing, 33 No. 2 gear, 34 No. 2 elastic collar for shaft, 35 No. 3 elastic collar for shaft, 36 No. 5 bearing, 37 cylindrical pin sleeve, 38 cylindrical pin, 39 cycloidal wheel, 40 No. 6 bearing, 41 No. 4 gear, 42 No. 2 internal hexagon socket head bolt, 43 No. 2 socket, 44 No. 7 bearing, 45 No. 3 bearing end cover, 46 output mechanism support shaft, 47 steering wheel, 48 steering transmission shaft, 49 cycloidal-pin wheel type transmission mechanism, 50 rotary hydraulic valve, 51 steering box, 52 steering shaft, 53 No. 1 universal joint, 54 No. 2 universal joint, 55 hydraulic cylinder, 56 dust shield, 57 tie rod, 58 No. 1 screw, 59 No. 2 screw, 60 spool, 61 torsion bar, 62 valve pocket positioning pin, 63 spool positioning pin, 64 spool gasket, 65 valve pocket gasket.

DETAILED DESCRIPTION OF EMBODIMENTS

The present invention will be described in details hereinafter by reference to the accompanying drawings.

Referring to FIG. 1, an automobile active steering system with a cycloidal-pin wheel mechanism in the present invention comprises a steering hand wheel 47, a steering shaft 52, a No. 1 universal joint 53, a steering transmission haft 48, a No. 2 universal joint 54, a cycloidal-pin wheel type transmission mechanism 49, a rotary hydraulic valve 50, a steering box 51, two dust shields 56 of the same structure, and two tie rods 57 of the same structure.

The steering hand wheel 47 can be a three-spoke steering wheel, a four-spoke steering wheel, or the like as required.

The steering transmission shaft 48 comprises a tube with internal splines and a shaft with external splines which are assembled together. The relative sliding between the tube with internal splines and the shaft with external splines can modify a length of the steering transmission shaft 48, so as to meet the arrangement requirements of different models of automobiles.

Figure 2:
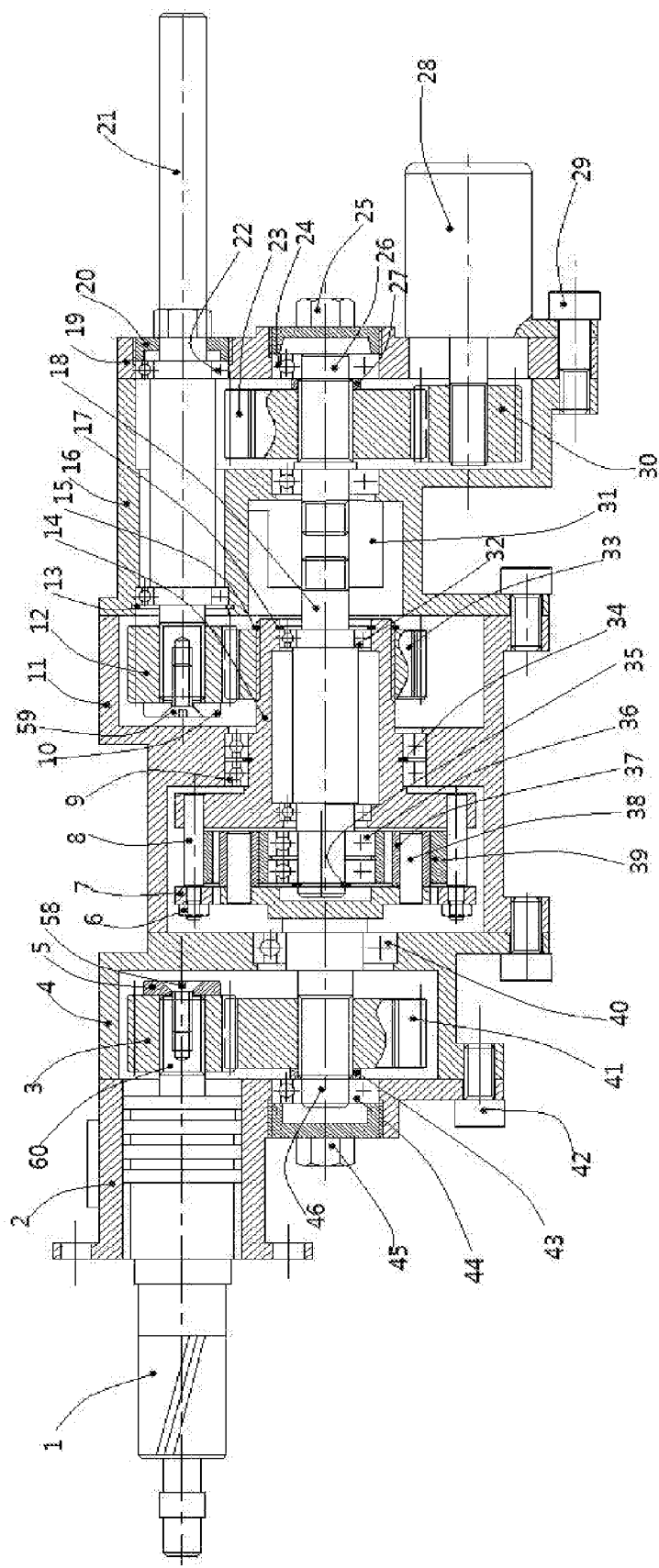
FIG. 2 is a generally sectional view illustrating the cycloidal-pin wheel type transmission mechanism for the automobile active steering system in the present invention.
Figure 3:
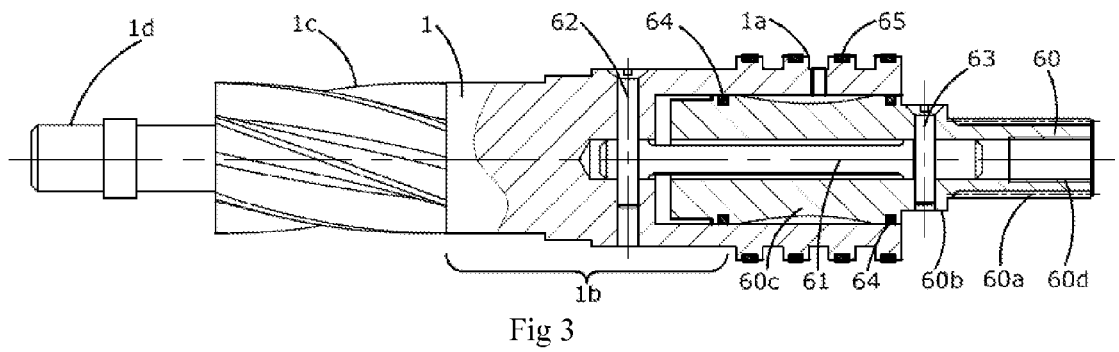
FIG. 3 is a generally sectional view illustrating a steering pinion part of the automobile active steering system in the present invention.

As shown in FIG. 1, FIG. 2, and FIG. 3, the rotary hydraulic valve 50 comprises a valve body 2 and a steering pinion part (which comprises a steering pinion shaft 1, a spool 60, a torsion bar 61, a valve pocket positioning pin 62, a spool positioning pin 63, a spool gasket 64, and a valve pocket gasket 65).

Figure 12:
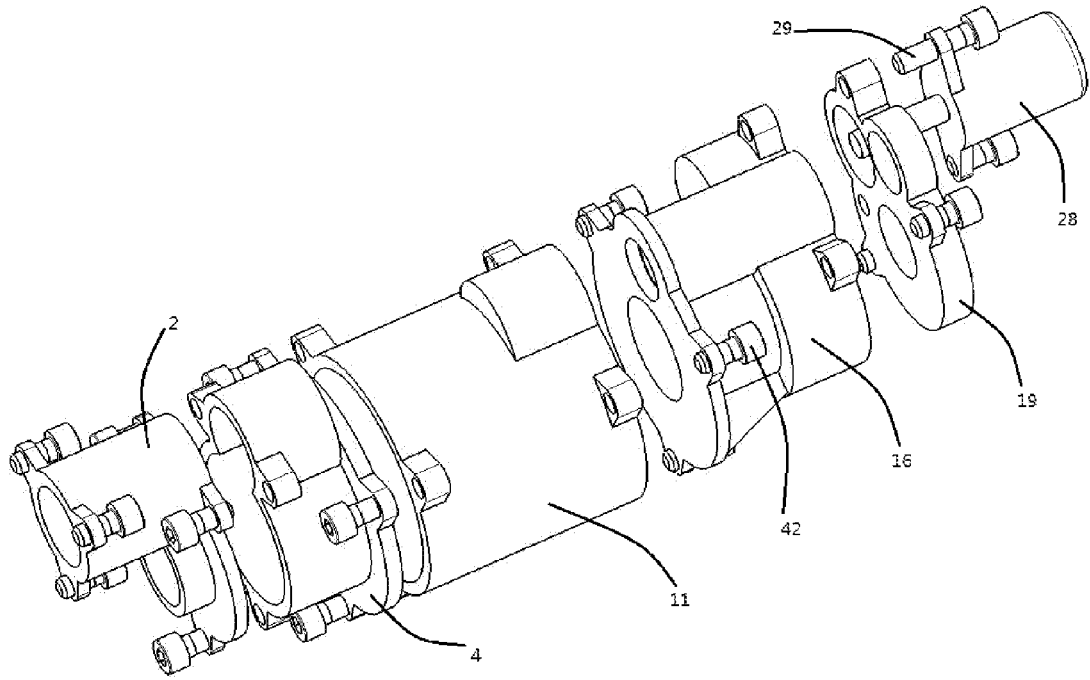
FIG. 12 is an exploded axonometric projection illustrating a shell of the cycloidal-pin wheel type transmission mechanism for the automobile active steering system in the present invention.
Figure 14:
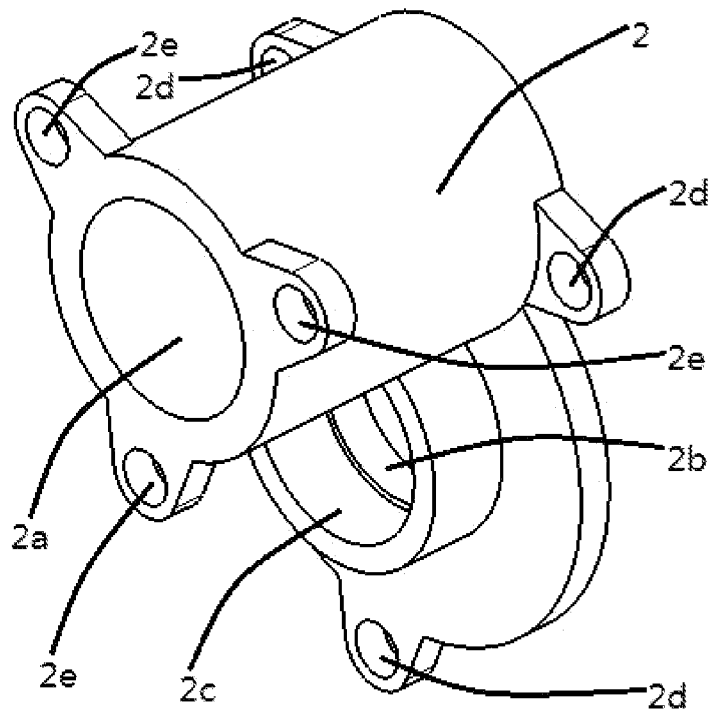
FIG. 14 is an axonometric projection illustrating a valve body of the cycloidal-pin wheel type transmission mechanism for the automobile active steering system in the present invention.

As shown in FIG. 2, FIG. 12, and FIG. 14, the valve body 2 is a shell-type structural member, and comprises two rotary bodies which run through each other. An upper portion of the valve body is a cylinder shaped rotary body, and a lower portion is a disc shaped rotary body. The cylinder shaped rotary body at the upper portion of the valve body 2 belongs to the rotary hydraulic valve 50, and acts as the valve body. The disc shaped rotary body at the lower portion of the valve body 2 belongs to a shell part of the cycloidal-pin wheel type transmission mechanism 49, and acts as a bearing seat bore. A left end face and a right end face of the valve body 2 are parallel with each other. An upper end of the valve body 2 is provided with a pinion shaft bore 2a for installing the steering pinion shaft 1. A lower end of the valve body 2 is provided with a bearing bore 2b for installing the No. 7 bearing 44. A left end of the bearing bore 2b is provided with a threaded bore 2c for installing the No. 3 bearing end cover 45. A revolving axis of the bearing bore 2b for installing the No. 7 bearing 44 is collinear with that of the threaded bore 2c for installing the No. 3 bearing end cover 45. A revolving axis of the pinion shaft bore 2a is parallel with that of the bearing bore 2b for installing the No. 7 bearing 44. The left end face of the valve body 2 is uniformly provided with three bores 2e of the same structure for installing bolts, so that the valve body 2 is connected with a shell of the steering box 51 by screws passing through the bores 2e. The right end face of the valve body 2 is also uniformly provided with three bolt bores 2d of the same structure for installing bolts, so that the valve body 2 is connected with a lower shell 4 of the cycloidal-pin wheel type transmission mechanism by bolts passing through the bolt bores 2d.

As shown in FIG. 2 and FIG. 3, the steering pinion part a steering pinion of a gear rack type steering box which is widely adopted in the current automobiles, and comprises the steering pinion shaft 1, the spool 60, the torsion bar 61, the valve pocket positioning pin 62, the spool positioning pin 63, the spool gasket 64, and the valve pocket gasket 65.

The steering pinion shaft 1 comprises a valve pocket section 1a, a transitional stepped shaft section 1b, a steering pinion 1c, and a left supporting shaft section 1d which are integrally assembled. Revolving axes for the valve pocket section 1a, the transitional stepped shaft section 1b, the steering pinion 1c, and the left supporting shaft section 1d are collinear with each other, and their shaft necks taper off from right to left. A stepped bore is formed inside the valve pocket section 1a, and a radial bore is formed in a right end of the transitional stepped shaft section 1b. The valve pocket section 1a of the steering pinion shaft 1 comprises four angular bosses which are evenly spaced. An angular groove is arranged in an external cylindrical surface of each angular boss, and the valve pocket gasket 65 which is oil-proof is arranged in each groove. In a natural state after installing, the valve pocket gasket has an outer diameter slightly larger than that of angular bosses of the valve pocket section. Once the steering pinion shaft 1 is installed to the valve body 2, the valve pocket gasket 65 is compressed to deform and closely fit to an inner wall of the valve body 2 to provide sealing.

The spool 60 comprises from right to left an involute spline shaft section 60a, a spool positioning pin shaft section 60b, a spool section 60c, and a left unthreaded shaft end. Revolving axes of the involute spline shaft section 60a, the spool positioning pin shaft section 60b, the spool section 60c, and the left unthreaded shaft end are collinear with each other. Shaft necks at both sides of the spool section 60c taper to a left side and a right side, respectively. An isometric bore is formed at a center of the spool 60, a threaded bore is formed in an internal bore of the involute spline shaft section 60a, and a radial bore is formed at the intermediate portion of the spool positioning pin shaft section 60b. Isometric unthreaded shafts are arranged at both sides of the spool section of the spool 60, and nine crescent-shaped pits are arranged in an intermediate portion in the peripheral direction and are evenly spaced. These crescent-shaped pits form nine oil reservoirs. Two ring slots are arranged in an external cylindrical surface of the left and right end unthreaded shaft, respectively. An oil-proof spool gasket which is circular-arc-shaped is arranged in the ring slot. An external cylindrical surface of the spool gasket contacts and engages with an inner wall of the internal bore of the valve pocket section of the steering pinion shaft 1 to provide sealing.

The torsion bar 61 is a cylinder which has a large diameter at both ends and has a small diameter at the intermediate portion. A radial bore is formed in the left and right end of the external cylindrical surface, respectively. The left end of a larger diameter of the torsion bar 61 is inserted into a smaller bore of the stepped bore inside the valve pocket section 1a of the steering pinion 1c, until the radial bore at this end is aligned with a radial bore at the right end of the transitional stepped shaft section 1b of the steering pinion shaft 1. The valve pocket positioning pin 62 is inserted from the radial bore at the right end of the transitional stepped shaft section 1b of the steering pinion shaft 1 into the above aligned bore, so that the valve pocket positioning pin 62 connects the left end of the torsion bar 61 with the steering pinion 1c. The right end of a larger diameter of the torsion bar 61 is inserted into the bore inside the spool 60, until the radial bore at this end is aligned with the radial bore at the intermediate portion of the spool positioning pin shaft section 60b of the spool 60. The spool positioning pin 63 is inserted from the radial bore at the intermediate portion of the spool positioning pin shaft section 60b of the spool 60 into the above aligned bore, so that the spool positioning pin 63 connects the right end of the torsion bar 61 with the spool 60.

Like the case of the existing gear rack type hydraulic power assisted steering system, the steering pinion shaft 1 is installed to and rotationally connected with the pinion shaft bore 2a at the upper end of the valve body 2. Three angular oil reservoirs formed between four angular bosses of the valve pocket section 1a of the steering pinion shaft 1 and the inner wall of the valve body 2 confront three axial oil bores in the valve body 2, respectively. These three oil bores are connected with three hollow bolt tube joints by use of their inner wall threads. These three hollow bolt tube joints are connected from left to right with a high-pressure oil pump, a hydraulic cylinder left chamber, and a right chamber of the hydraulic power assisted steering system by use of three copper tubes for oil. The connection manner as described above is widely adopted in the rotary hydraulic valve of the existing hydraulic power assisted steering system.

As shown in FIG. 1, like the case of the existing gear rack type hydraulic power assisted steering system, the steering box 51 is a gear rack type hydraulic power assisted steering box, and comprises a hydraulic cylinder 55, a steering box rack, a steering box shell, and two dust shields 56 of the same structure. A gasket is arranged between a right end of the hydraulic cylinder 55 and a left end face of the steering box shell, and then the hydraulic cylinder 55 is connected with the steering box shell by use of a bolt. The hydraulic cylinder 55 has a piston rod. The piston rod is connected with the steering box rack by use of engagement between external threads at a right end of the piston rod and threads of an internal threaded bore at the left end of the steering box rack. The piston rod passes through bores in the above mentioned shell connection face. An O-shaped gasket is arranged in a ring slot on the inner wall of the bore, and closely fits to an outer wall of the piston rod to prevent the hydraulic oil from leaking from the hydraulic cylinder. The piston rod of the hydraulic cylinder 55 is connected at its left end with a tie rod 57 which is arranged at a left side of the steering box 51 by use of a bulb. The steering box rack is connected at its right end with another tie rod 57 which is arranged at a right side of the steering box 51 by use of a bulb. The dust shield extensible in the axial direction, is socketed at one end with a portion of the tie rod 57 where the diameter is varied, and is socketed at the other end into the ring slot in the outer wall at the left end of the hydraulic cylinder 55 and the ring slot in the outer wall at the right end of the steering box shell. It is noted that the steering box of the present invention is a gear rack type steering box. However, the active steering system of the present invention is not limited to this kind of steering box.

The steering hand wheel 47 is connected with an upper end of the steering shaft 52 by use of a spline pair, a lower end of the steering shaft 52 is connected with an upper end of the steering transmission shaft 48 by use of the No. 1 universal joint 53, the other end of the steering transmission shaft 48 is connected with a right end of an input shaft 21 of the cycloidal-pin wheel type transmission mechanism 49 by use of the No. 2 universal joint 54, the No. 3 gear 3 of an output part in the cycloidal-pin wheel type transmission mechanism 49 is connected with a right end of the spool 60 in the rotary hydraulic valve 50 by use of an involute spline pair, and the No. 3 gear 3 is axially fastened to the involute spline shaft section 60a of the spool 60 by use of the No. 1 shaft end collar 5 and the No. 1 screw 58, wherein the steering pinion 1c of the steering pinion shaft 1 is engaged with the steering box rack of the steering box 51.

As shown in FIG. 2 and FIG. 12, the cycloidal-pin wheel type transmission mechanism 49 is a core part in the automobile active steering system in the present invention. The cycloidal-pin wheel type transmission mechanism 49 comprises an input part, a servo motor part, an intermediate shaft part, an eccentric shaft part, a pin gear ring part, an output part, a shell part, an electromagnetic clutch 31, a No. 1 internal hexagon socket head bolt 29, and fifteen No. 2 internal hexagon socket head bolts 42.

Figure 4:
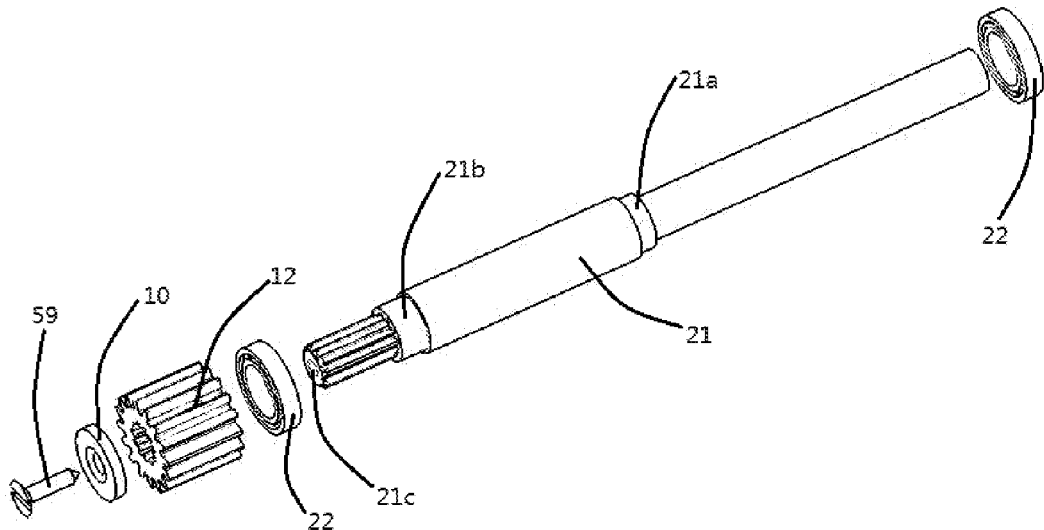
FIG. 4 is an axonometric projection illustrating an input part of the cycloidal-pin wheel type transmission mechanism for the automobile active steering system in the present invention.

As shown in FIG. 2 and FIG. 4, the input part comprises the input shaft 21, two No. 2 bearings 22 of the same structure, a No. 1 gear 12, a No. 2 shaft end collar 10, and a screw 59. The No. 2 bearings 22 may be bearings of the model 61802, and the No. 1 gear 12 has 16 teeth in the present embodiment.

The input shaft 21 is a structural member with a straight rod and variable cross section, and comprises from right to left a right unthreaded shaft, a No. 1 shaft neck 21a, a middle unthreaded shaft, a No. 2 shaft neck 21b, and a spline shaft section. Revolving axes of the right unthreaded shaft, the No. 1 shaft neck 21a, the middle unthreaded shaft, the No. 2 shaft neck 21b, and the spline shaft section are collinear with each other. The middle unthreaded shaft has the largest diameter, and shafts at both sides of the middle unthreaded shaft have a tapering diameter. The input shaft 21 is provided with a threaded bore 21c at a center of a left end face.

Two No. 2 bearings 22 of the same structure are assembled with the No. 1 shaft neck 21a and the No. 2 shaft neck 21b of the input shaft 21, respectively. The left and right end face in the inner ring of two No. 2 bearings 22 of the same structure are connected to contact with shoulders of the No. 1 shaft neck 21a and the No. 2 shaft neck 21b of the input shaft 21 to provide axial positioning. The No. 1 gear 12 is assembled to a spline shaft at a left end of the input shaft 21 with an involute spline pair, and is connected with a left end face of the No. 2 shaft neck 21b to provide axial positioning. Further, the No. 2 shaft end collar 10 and the No. 2 screw 59 are installed in the threaded bore 21c at a center of a left end face of the input shaft 21, and a right end face of the No. 2 shaft end collar 10 is connected with a left end face of the No. 1 gear 12, so that the No. 1 gear 12 is axially compressed onto a spline shaft at a left end of the input shaft 21.

Figure 5:
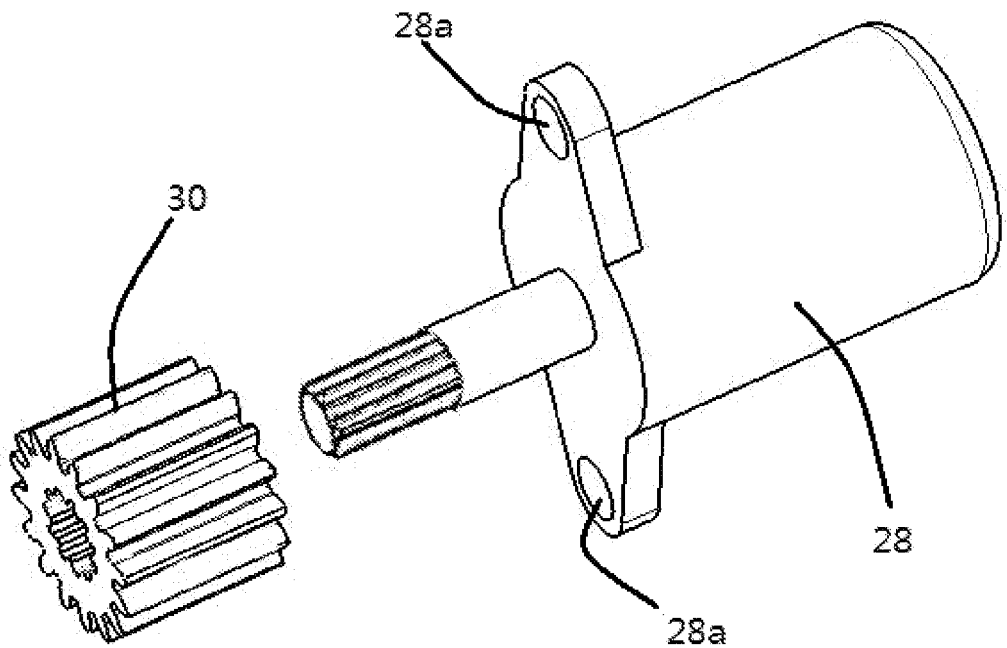
FIG. 5 is an axonometric projection illustrating a servo motor part of the cycloidal-pin wheel type transmission mechanism for the automobile active steering system in the present invention.

As shown in FIG. 2 and FIG. 5, the servo motor part comprises a No. 5 gear 30 and a servo motor 28.

Two bolt bores 28a are arranged on two mounting flanges of the same structure at a left end of the shell of the servo motor 28. A left end of an output shaft of the servo motor 28 is formed into an involute spline shaft section, and the No. 5 gear 30 has 16 teeth in the present embodiment.

The No. 5 gear 30 and the servo motor 28 are installed on the output shaft of the servo motor 28 by use of an involute spline pair and interference fit. A right end face of the No. 5 gear 30 contacts a left end face of an unthreaded shaft of a spline shaft right end of the servo motor 28 to provide axial positioning.

Figure 6:
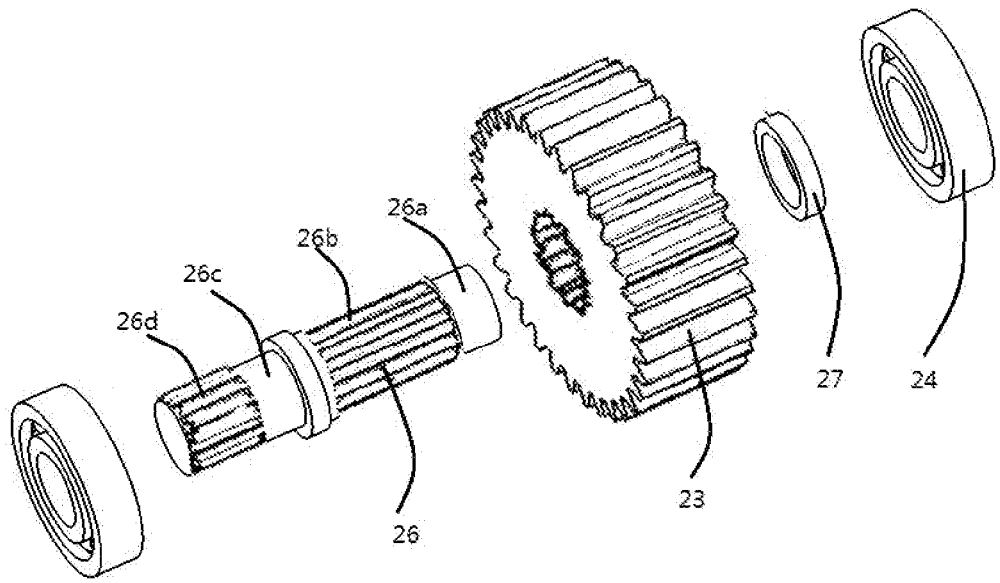
FIG. 6 is an exploded axonometric projection illustrating an intermediate shaft part of the cycloidal-pin wheel type transmission mechanism for the automobile active steering system in the present invention.

As shown in FIG. 2 and FIG. 6, the intermediate shaft part comprises a No. 6 gear 23, two No. 3 bearings 24 of the same structure, an intermediate shaft 26, and a No. 1 socket 27. The No. 3 bearings 24 adopt bearings of the model 16001, and the No. 6 gear 23 has 33 teeth in the present embodiment.

The intermediate shaft 26 comprises a No. 1 shaft neck 26a, a No. 1 involute spline shaft 26b, a flange, a No. 2 unthreaded shaft neck 26c, and a No. 2 involute spline shaft 26d. Revolving axes of the No. 1 unthreaded shaft neck 26a, the No. 1 involute spline shaft 26b, an intermediate shoulder, the No. 2 unthreaded shaft neck 26c, and the No. 2 involute spline shaft 26d are collinear with each other. The middle unthreaded shaft flange has the largest diameter, and shafts at both sides of the middle intermediate shoulder have tapering diameters.

The No. 6 gear 23 and the No. 1 socket 27 are assembled from right to left to the involute spline shaft 26b of the intermediate shaft 26. The No. 6 gear 23 is connected with the No. 1 involute spline shaft 26b of the intermediate shaft 26 by use of an involute spline pair, and realizes axial positioning by an end face at a left end spline groove of the No. 1 involute spline shaft 26b. The No. 1 socket 27 is assembled to the No. 1 involute spline shaft 26b at a right side of the No. 6 gear 23, a left end face of the No. 1 socket 27 is connected to contact a right end face of the No. 6 gear 23, one of the No. 3 bearings 24 is assembled to the No. 1 shaft neck 26a at a right end of the intermediate shaft 26, and a left end face at an inner ring of the No. 3 bearing 24 is connected to contact a right end face of the No. 1 socket 27 to provide axial positioning. The other No. 3 bearing 24 is assembled to the No. 2 unthreaded shaft neck 26c at a left end of the intermediate shaft 26, and a right end face at an inner ring of the other No. 3 bearing 24 is connected to contact a left end face of the intermediate shaft shoulder of the intermediate shaft 26 to provide axial positioning.

Figure 7:
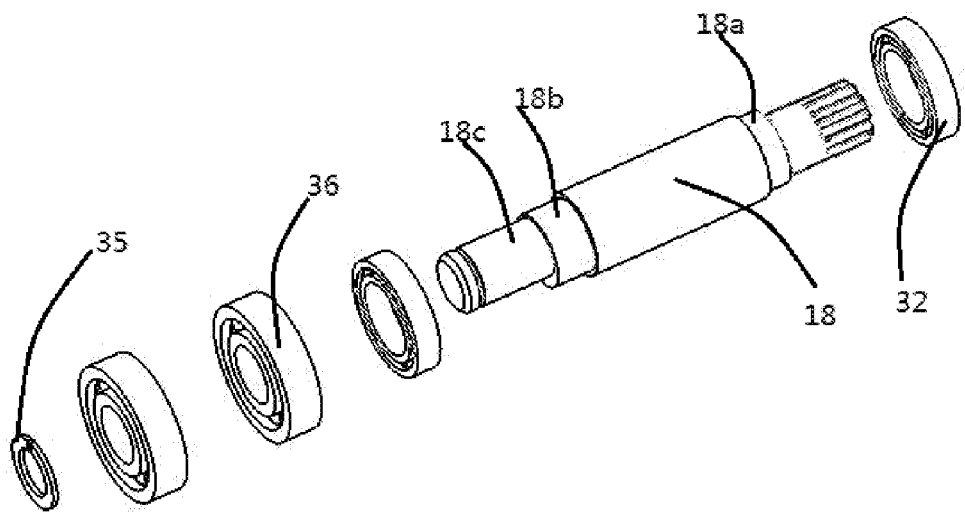
FIG. 7 is an exploded axonometric projection illustrating an eccentric shaft part of the cycloidal-pin wheel type transmission mechanism for the automobile active steering system in the present invention.
Figure 8:
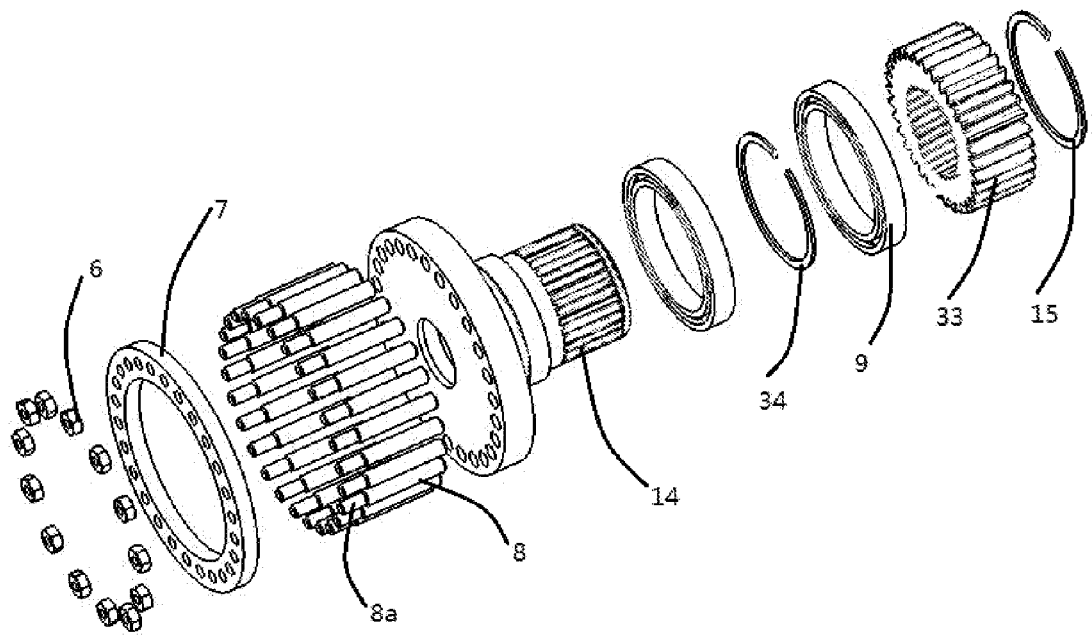
FIG. 8 is an exploded axonometric projection illustrating a pin gear ring part of the cycloidal-pin wheel type transmission mechanism for the automobile active steering system in the present invention.
Figure 11:
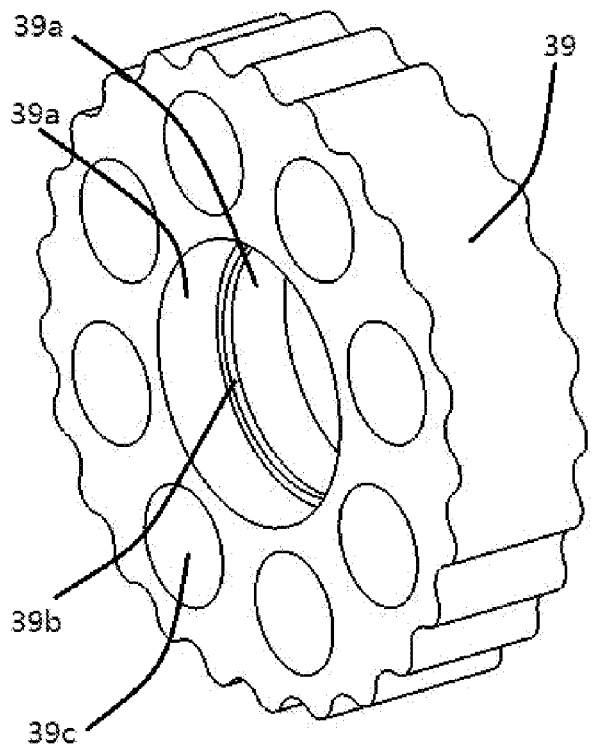
FIG. 11 is an axonometric projection illustrating a cycloidal wheel of the cycloidal-pin wheel type transmission mechanism for the automobile active steering system in the present invention.

As shown in FIG. 2, FIG. 7, and FIG. 11, the eccentric shaft part comprises an eccentric shaft 18, two No. 4 bearings 32 of the same structure, a No. 3 elastic collar 35 for shaft, two No. 5 bearings 36 of the same structure, and a cycloidal wheel 39. In the present embodiment, the No. 4 bearing 32 and the No. 5 bearing 36 adopt bearings of the model 61802 and 16001, respectively.

The eccentric shaft 18 comprises a right section shaft, a No. 1 shaft neck 18a, a middle unthreaded shaft, the No. 2 shaft neck 18b, and an eccentric unthreaded shaft neck 18c. The eccentric unthreaded shaft neck 18c is provided with a stopping slot at its left end. Revolving axes of the right section shaft, the No. 1 shaft neck 18a, the middle unthreaded shaft, and the No. 2 shaft neck 18b are collinear with each other. The revolving axis of the eccentric unthreaded shaft neck 18c is parallel with that of the No. 2 shaft neck (18b), and the eccentric distance between them is 1 mm. The middle unthreaded shaft has the largest diameter, and shafts at both sides of the middle unthreaded shaft have tapering diameters. An involute spline shaft section is formed at a right side of the right section shaft.

The cycloidal wheel 39 is a disc type structural member. A bore is arranged at a center of the cycloidal wheel 39, and an in-bore convex shoulder 39b of generally circular shape is arranged at a center of the bore. The convex shoulder 39b divides the bore into two bearing bores 39a of the same structure. Revolving axes of two bearing bores 39a and the in-bore convex shoulder 39b are collinear with each other. Eight cylindrical pin bores 39c of the same structure are uniformly arranged around two bearing bores 39a. Arc shaped gear teeth of the same structure are arranged around the cycloidal wheel 39. In this embodiment, the cycloidal wheel 39 has 25 teeth, and an eccentric distance between the revolving axis of these teeth and that of the eccentric shaft 18 is 1 mm.

Two No. 4 bearings 32 of the same structure are assembled to the shaft neck 18a and the shaft neck 18b of the eccentric shaft 18, respectively. A right end face of an inner ring of the No. 4 bearing 32 at the left end is connected to contact an end face of the right end shoulder of the shaft neck 18b of the eccentric shaft 18 to provide axial positioning. A left end face of an inner ring of the No. 4 bearing 32 at a right end is connected to contact an end face of a left end shoulder of the shaft neck 18a of the eccentric shaft 18 to provide axial positioning. Two No. 5 bearings 36 of the same structure are assembled in a side by side manner to the eccentric unthreaded shaft neck 18c at the leftmost end of the eccentric shaft 18. The No. 3 elastic collar 35 for shaft is assembled to a groove on the eccentric shaft 18 at a left side of the No. 5 bearing 36 at the leftmost side. A right end face of the No. 3 elastic collar 35 for shaft is connected to contact a left end face of an inner ring of the No. 5 bearing 36 at the leftmost side to provide axial positioning. A gap exists between two No. 5 bearings 36 of the same structure, and has the same distance to the in-bore convex shoulder 39b of the central bore of the cycloidal wheel 39. The cycloidal wheel 39 is assembled to two No. 5 bearings 36 of the same structure. The in-bore convex shoulder 39b of the central bore of the cycloidal wheel 39 is installed between two No. 5 bearings 36 of the same structure. The left and right angular end faces of the in-bore convex shoulder 39b for the central bore of the cycloidal wheel 39 are respectively connected to contact the right and left end faces at an outer ring of two No. 5 bearings 36 of the same structure.

As shown in FIG. 2, FIG. 8, FIG. 13, and FIG. 19, the pin gear ring part comprises thirteen nuts 6 of the same structure, a supporting ring 7, twenty-six pin gears 8 of the same structure, two No. 1 bearings 9 of the same structure, a pin gear rack hollow shaft 14, a No. 1 elastic collar for shaft 15, a No. 2 gear 33, a No. 2 elastic collar for shaft 34. In this embodiment, the nuts 6 are of the model M4×3.2, the No. 1 bearings 9 are of the model 61808, and the No. 2 gear 33 has 33 teeth.

The pin gear rack hollow shaft 14 is a rotary body comprises a flange plate at a left end and a cylinder at a right end which are formed integrally. Revolving axes of the flange plate and the cylinder are collinear with each other. The flange plate is uniformly provided with twenty-six pin gear bores 14f for installing pin gears. Two unthreaded shaft necks 14d of the same structure and spline shaft sections are arranged successively in an outer circumferential face of the cylinder at a right side of the flange plate. A groove 14e is arranged between two unthreaded shaft necks 14d of the same structure. For the unthreaded shaft neck 14d at a left end, a shoulder is arranged at a left end of the unthreaded shaft neck 14d. A groove 14c is arranged at a right end of the spline shaft section. A stepped bore is arranged at a center of the cylinder. A bearing bore 14b, a middle unthreaded bore, and a bearing bore 14g are arranged successively from right to left. The bearing bore 14b and the bearing bore 14g are of the same diameter. A groove 14a is formed in a right inner wall of the bearing bore 14b. The middle unthreaded bore has a diameter larger than that of the bearing bore 14b and the bearing bore 14g. An in-bore positioning convex shoulder is arranged at a left end of the bearing bore 14g.

The pin gear 8 comprises a left small-diameter section and a right large-diameter section, the right large-diameter section is an unthreaded shaft, the left small-diameter section has a diameter less than that of the right large-diameter section. A left section of the left small-diameter section is provided with external threads, a right section of the left small-diameter section is an unthreaded shaft neck, and a chamfer is arranged between the left small-diameter section and the right large-diameter section.

Large end unthreaded shafts of twenty-six pin gears 8 of the same structure and the twenty-six pin gear bores 14f which are uniformly arranged on a large disc end of the pin gear rack hollow shaft 14 are installed to the pin gear rack hollow shaft 14 successively by use of interference fit. The twenty-six bores in the supporting ring 7, which are aligned with the twenty-six pin gear bores 14f in the large disc end, are respectively assembled to small end unthreaded shaft necks at a left section of the twenty-six pin gears 8. A right end face of the supporting ring 7 is connected to contact a chamfer between small end shaft necks at a left section of the twenty-six pin gears 8 of the same structure and large end shaft necks of the pin gears 8. Namely, axial positioning is realized by a chamfer at the center of the twenty-six pin gears 8 of the same structure. Thirteen nuts 6 of the same structure are alternately connected with external threads at a small end of thirteen pin gears 8 among the twenty-six pin gears 8, so that the supporting ring 7 is fastened to the twenty-six pin gears 8. The No. 1 bearings 9 at a left side is assembled to the shaft neck 14d at a left side of the pin gear rack hollow shaft 14, and a left end face of the inner ring of the No. 1 bearing 9 at a left side is connected to contact a right end face of the left side shoulder of the shaft neck 14d at a left side of the pin gear rack hollow shaft 14 to provide axial positioning. The No. 2 elastic collar for shaft 34 is stuck in the groove 14e of the pin gear rack hollow shaft 14, and a left end face of the No. 2 elastic collar for shaft 34 is connected to contact a right end face of the inner ring of the No. 1 bearing 9 at a left side to provide axial positioning. The No. 1 bearing 9 at a right side is assembled to one of the shaft necks 14d at a right side of the pin gear rack hollow shaft 14, a left end face of the inner ring of the No. 1 bearing 9 at a right side is connected to contact a right end face of the No. 2 elastic collar for shaft 34 to provide axial positioning. The No. 2 gear 33 is assembled to an involute spline shaft at a right end of the pin gear rack hollow shaft 14, and axial positioning is realized by a left end spline groove end face of an involute spline shaft. The No. 1 elastic collar for shaft 15 is installed to the groove 14c of the pin gear rack hollow shaft 14 at a right side of the No. 2 gear 33, and a left end face of the No. 1 elastic collar for shaft 15 is connected to contact a right end face of the No. 2 gear 33 to provide axial compression.

Figure 9:
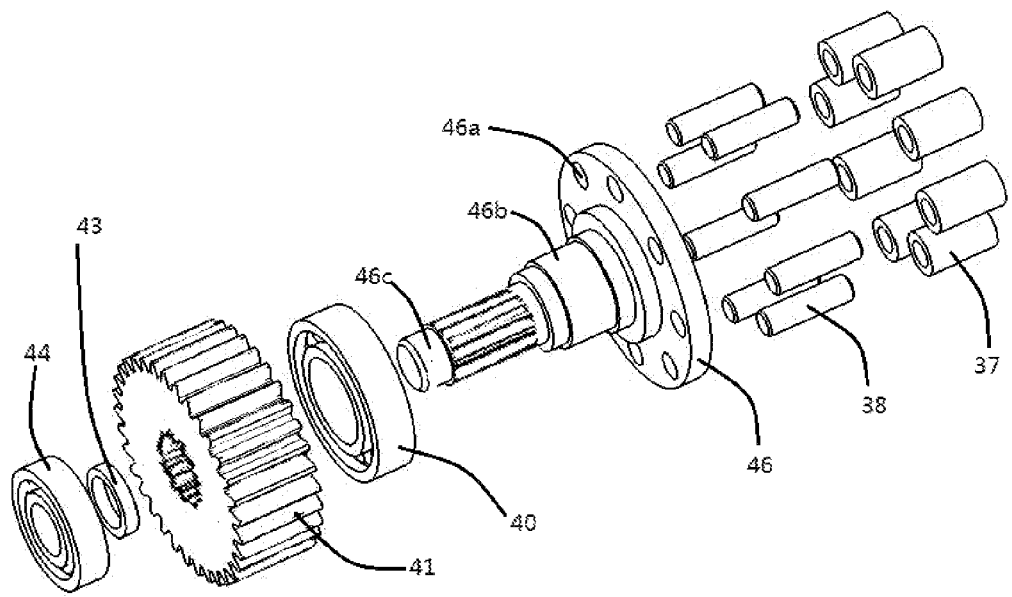
FIG. 9 is an exploded axonometric projection illustrating an output part of the cycloidal-pin wheel type transmission mechanism for the automobile active steering system in the present invention.
Figure 10:
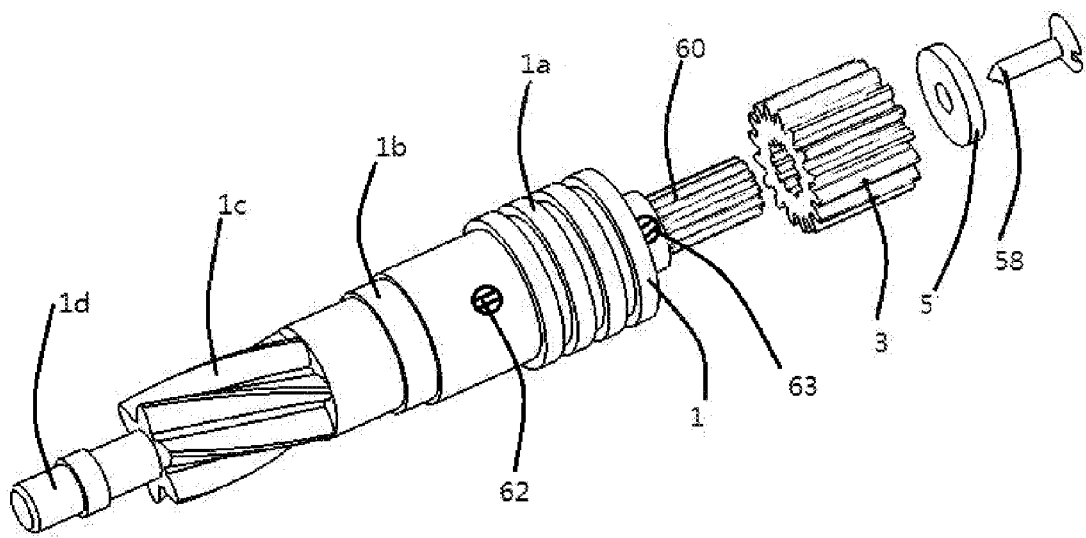
FIG. 10 is an exploded axonometric projection illustrating the assembling state between a No. 3 gear of an output part and a steering pinion part of the cycloidal-pin wheel type transmission mechanism for the automobile active steering system in the present invention.

As shown in FIG. 2, FIG. 9, and FIG. 10, the output part comprises eight cylindrical pin sleeves 37 of the same structure, eight cylindrical pins 38 of the same structure, a No. 6 bearing 40, a No. 4 gear 41, the No. 3 gear 3, the No. 1 shaft end collar 5, the No. 1 screw 58, a No. 2 socket 43, the No. 7 bearing 44, and an output mechanism support shaft 46. In this embodiment, the No. 6 bearing 40 is of the model 61904, the No. 7 bearing 44 is of the model 16001, the No. 4 gear 41 has 33 teeth, and the No. 3 gear 3 has 16 teeth.

The output mechanism support shaft 46 comprises a flange plate at a right end and a stepped shaft at a left end which are integrally assembled. Revolving axes of the flange plate at the right end and the stepped shaft at the left end are collinear with each other. Eight cylindrical pin bores 46a of the same structure for installing cylindrical pins 38 are uniformly arranged in the peripheral direction on the flange plate. A right shoulder, a No. 1 shaft neck 46b, a spline shaft, and a No. 2 shaft neck 46c are arranged on the stepped shaft at a left end successively from right to left, and shaft necks successively taper.

(Left) ends of eight cylindrical pins 38 of the same structure are successively installed to eight cylindrical pin bores 46a which are uniformly arranged on a large end (flange plate) of the output mechanism support shaft 46 by use of interference fit. Eight cylindrical pin sleeves 37 of the same structure are successively assembled to eight cylindrical pins 38 of the same structure. Eight cylindrical pins 38 of the same structure and eight cylindrical pin sleeves 37 of the same structure are connected by clearance fit and can rotate with respect to each other freely in the circumferential direction. The No. 6 bearing 40, the No. 4 gear 41, the No. 2 socket 43, and the No. 7 bearing 44 are successively socketed into a small end of the output mechanism support shaft 46. The No. 6 bearing 40 is socketed onto the No. 1 shaft neck 46b at a left end of the output mechanism support shaft 46 by use of interference fit. A right end face at an inner ring of the No. 6 bearing 40 contacts a shoulder at a right side of the shaft neck 46b on the output mechanism support shaft 46 to provide axial positioning. The No. 4 gear 41 is connected with the involute spline shaft section of the output mechanism support shaft 46 by use of a spline pair. A right end face of the No. 4 gear 41 contacts a spline groove end face of the involute spline shaft section to provide axial positioning. The No. 2 socket 43 is socketed onto an involute spline of the output mechanism support shaft 46 by use of clearance fit, and a right end face of the No. 2 socket 43 is connected to contact a left end face of the No. 4 gear 41. The No. 7 bearing 44 is assembled to the shaft neck 46c of the output mechanism support shaft 46. An inner ring right end face of the No. 7 bearing 44 is connected to contact a left end face of the No. 2 socket 43 to provide axial positioning.

An internal splines bore is arranged at a center of the No. 3 gear 3, which is installed on the involute spline shaft section 60a at a right end of the spool 60 of the steering pinion part by use of a spline pair. A left end face of the No. 3 gear 3 contacts the spline groove end face of the involute spline shaft section to provide axial positioning. The No. 1 shaft end collar 5 and the No. 1 screw 58 are further screwed into an axial end central threaded bore 60c in a right end face of the steering pinion shaft 1. A left end face of the No. 1 shaft end collar 5 is connected to contact a right end face of the No. 3 gear 3. Once the No. 1 screw 58 is screwed into the threaded bore 60c, it fastens the No. 3 gear 3 to the spline shaft 60a at a right end of the spool 60 by an axial positioning function of the No. 1 shaft end collar 5. The No. 3 gear 3 and the No. 4 gear 41 are driven by external toothing.

As shown in FIG. 2 and FIG. 12, the shell part comprises an upper cover 19, an upper shell 16, an intermediate shell 11, the lower shell 4, the valve body 2, a No. 1 bearing end cover 20, a No. 2 bearing end cover 25, and a No. 3 bearing end cover 45.

The No. 1 bearing end cover 20, the No. 2 bearing end cover 25, and the No. 3 bearing end cover 45 comprise a small end with an external hexagon nut and a large-end end cover with external threads which are integrally assembled. A bore is arranged at a center of the No. 1 bearing end cover 20 for installing an unthreaded shaft section at a right end of the input shaft 21.

As shown in FIG. 2, FIG. 12, and FIG. 14, the valve body 2 is a shell-type structural member, and comprises two rotary bodies which run through each other. An upper portion of the valve body is a cylinder shaped rotary body, and a lower portion is a disc shaped rotary body. The cylinder shaped rotary body at the upper portion of the valve body 2 belongs to the rotary hydraulic valve 50, and acts as the valve body. The disc shaped rotary body at the lower portion of the valve body 2 belongs to a shell part of the cycloidal-pin wheel type transmission mechanism 49, and acts as a bearing seat bore. A left end face and a right end face of the valve body 2 are parallel with each other. An upper end of the valve body 2 is provided with a pinion shaft bore 2a for installing the steering pinion shaft 1. A lower end of the valve body 2 is provided with a bearing bore 2b for installing the No. 7 bearing 44. A left end of the bearing bore 2b is provided with a threaded bore 2c for installing the No. 3 bearing end cover 45. A revolving axis of the bearing bore 2b is collinear with that of the threaded bore 2c, and is parallel with the revolving axis of the pinion shaft bore 2a. Three convex lugs of the same structure are arranged radially on a left end face and a right end face of the valve body 2. Three left convex lugs of the same structure are arranged around a left end of the pinion shaft bore 2a for purpose of fastening. The three left convex lugs of the same structure are provided with bolt bores 2e. Three right convex lugs of the same structure are arranged around a right end of the bearing bore 2b for purpose of fastening, and bolt bores 2d are arranged in three right convex lugs of the same structure. In a similar manner with the valve body of the rotary hydraulic valve in the existing hydraulic power assisted steering system, four oil bores with internal threads (not shown) are arranged the external cylindrical surface of the valve body bore section 2a, namely, a high-pressure oil bore, a low-pressure oil bore, a hydraulic cylinder left chamber oil bore, and a hydraulic cylinder right chamber oil bore.

Figure 15:
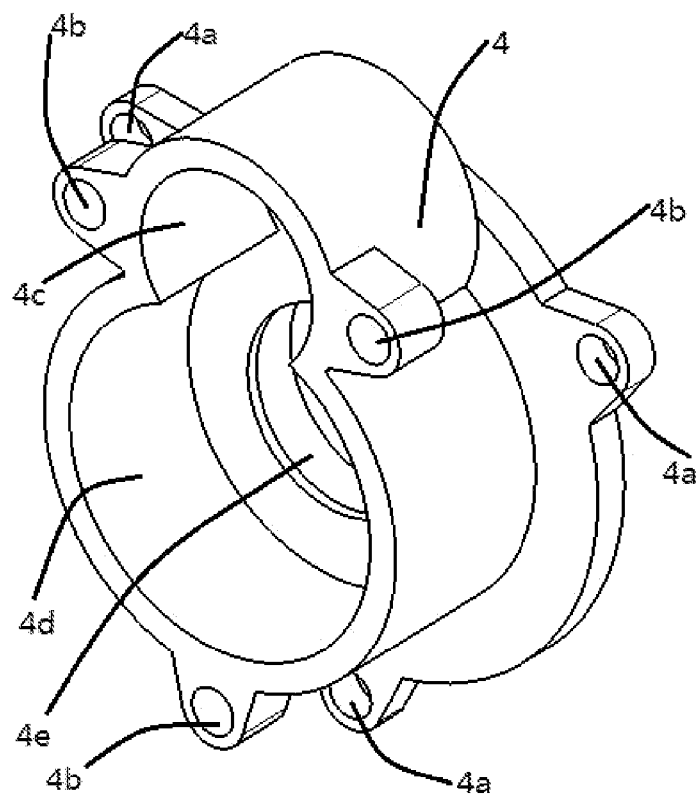
FIG. 15 is an axonometric projection illustrating a lower shell of the cycloidal-pin wheel type transmission mechanism for the automobile active steering system in the present invention.

As shown in FIG. 2, FIG. 12, and FIG. 15, the lower shell 4 comprises a shell piece which is formed by two torus running through each other. A small internal chamber 4c and a large internal chamber 4d are formed in the shell and communicate with each other. A bearing bore 4e is arranged at a right end of the large internal chamber 4d. A revolving axis of the large internal chamber 4d is collinear with that of the bearing bore 4e and is parallel with a revolving axis of the small internal chamber 4c. Three right side convex lugs of the same structure are arranged around the right end bosses of the small internal chamber 4c and the large internal chamber 4d, and bolt bores 4a are arranged at centers of the convex lugs. Three left side convex lugs of the same structure are arranged around the left end of the small internal chamber 4c and the large internal chamber 4d, and threaded bores 4b are arranged at centers of the convex lugs.

Figure 16:
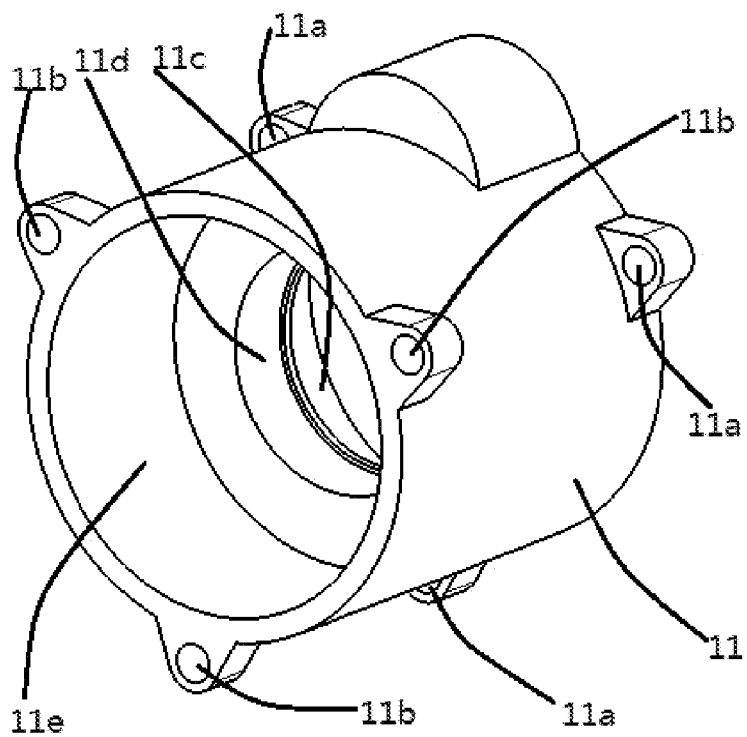
FIG. 16 is an axonometric projection illustrating an intermediate shell of the cycloidal-pin wheel type transmission mechanism of the automobile active steering system in the present invention.

As shown in FIG. 2, FIG. 12, and FIG. 16, the intermediate shell 11 is a cylinder-type structural member. A right internal circular bore 11c, a bearing bore 11d, and a left internal chamber 11e with revolving axes which are collinear with each other are successively arranged from right to left at a center of the cylinder. A circular-arc-shaped small boss internal chamber is formed at an upper portion of the right internal circular bore 11c of the intermediate shell 11, and runs through the right internal circular bore 11c. A right end of the intermediate shell 11 is provided with three right side convex lugs of the same structure for installing, and threaded bores 11a are arranged at centers of the convex lugs. A left end of the intermediate shell 11 is provided with three left side convex lugs of the same structure for installing, and threaded bores 11b are arranged at centers of the convex lugs.

Figure 17:
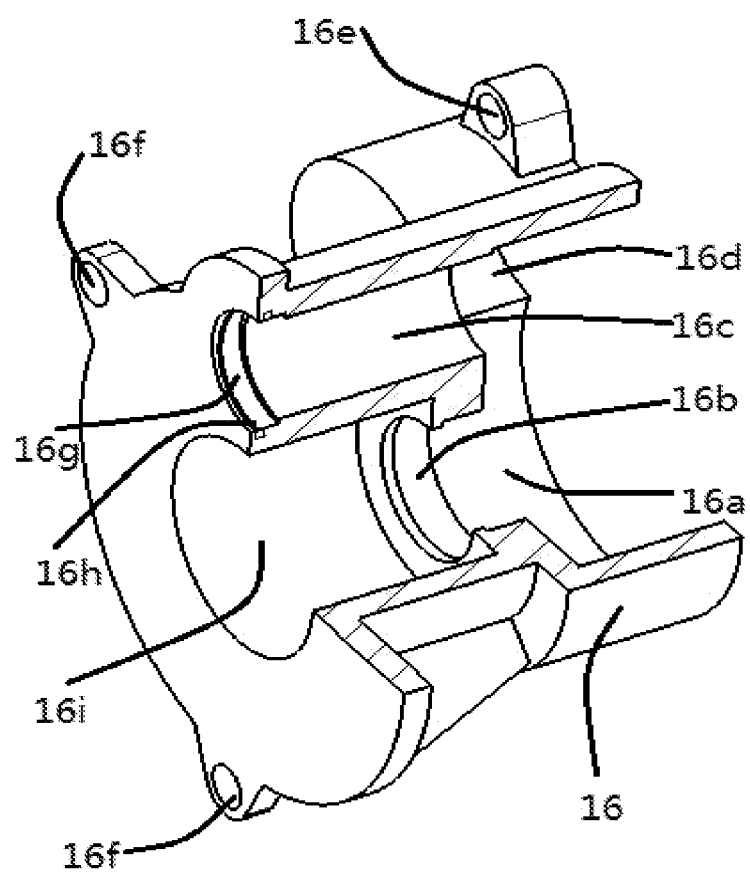
FIG. 17 is an axonometric projection illustrating an upper shell of the cycloidal-pin wheel type transmission mechanism for the automobile active steering system in the present invention.

As shown in FIG. 2, FIG. 12, and FIG. 17, the upper shell 16 is an irregular cylinder-type structural member. A right upper internal chamber 16d, an upper bore 16c, a bearing bore 16g, and a groove 16h are arranged successively from right to left on an upper end of the upper shell 16. A right lower internal chamber 16a, a bearing bore 16b, an in-bore flange of the bearing bore 16b, and a left lower bore 16i are arranged successively from right to left on a lower end of the upper shell 16. Three left side convex lugs of the same structure are arranged around a left end of the upper shell 16. Bolt bores 16f are formed at center of the convex lugs. Three right side convex lugs of the same structure are arranged around the right end of the upper shell 16, and threaded bores 16e are formed at centers of convex lugs. Revolving axes of the right upper internal chamber 16d, the upper bore 16c, and the bearing bore 16g are collinear with each other. Revolving axes of the right lower internal chamber 16a, the bearing bore 16b, the in-bore flange of the bearing bore 16b, and the left lower bore 16i are collinear with each other. Revolving axes of the upper bore 16c and that of the left lower bore 16i are parallel with each other.

Figure 18:
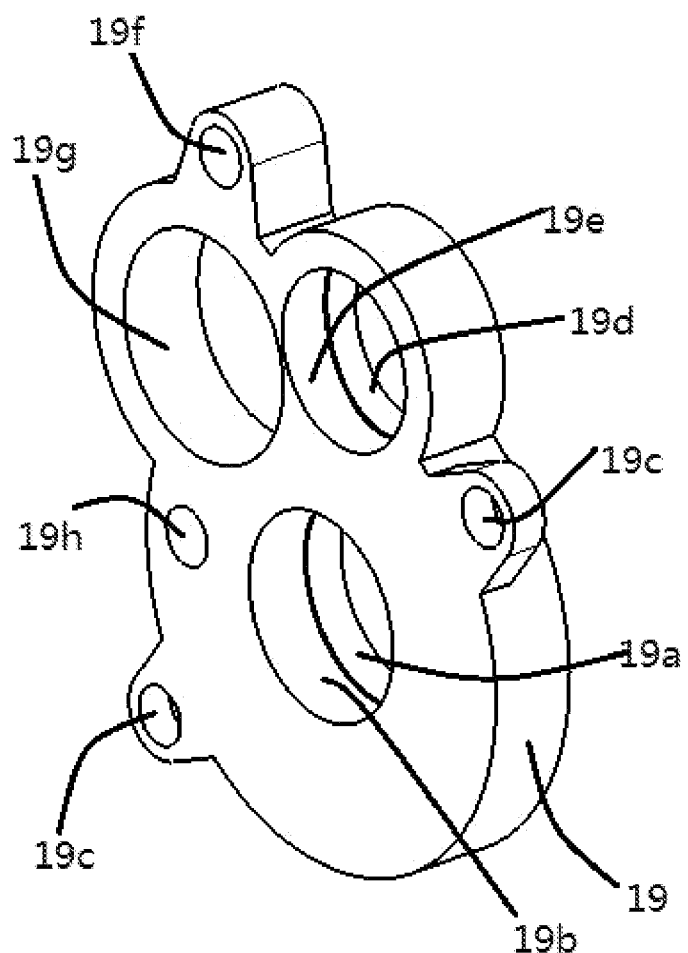
FIG. 18 is an axonometric projection illustrating an upper cover for the cycloidal-pin wheel type transmission mechanism of the automobile active steering system in the present invention.
Figure 19:
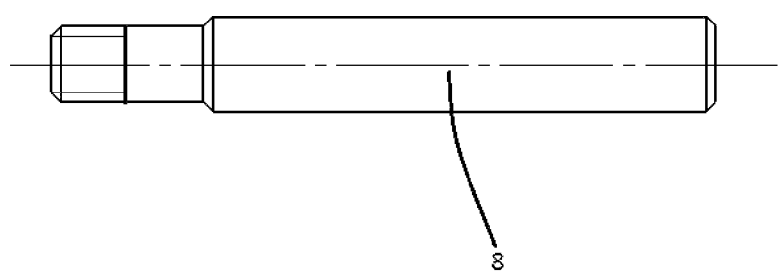
FIG. 19 is a front view illustrating a pin gear in a cycloidal-pin wheel type transmission mechanism for the automobile active steering system in the present invention.

As shown in FIG. 2, FIG. 12, and FIG. 18, the upper cover 19 is an irregular disc structural member. An upper threaded bore 19d and an upper bearing bore 19e are arranged successively from right to left on an upper end of the upper cover 19. Revolving axes of the upper threaded bore 19d and the upper bearing bore 19e are collinear with each other. A lower threaded bore 19a and a lower bearing bore 19b are arranged successively from right to left on a lower end of the upper cover 19. Revolving axes of the lower threaded bore 19a and the lower bearing bore 19b are collinear with each other. The revolving axis of the upper bearing bore 19e is parallel with that of the lower bearing bore 19b. A rear upper bore 19g is arranged at a rear side of the upper bearing bore 19e, and two bolt bores 19c of the same structure, a bolt bore 19f, and a threaded bore 19h are arranged around the upper cover 19.

As shown in FIG. 2, FIG. 4, FIG. 12, FIG. 17, and FIG. 18, the input shaft 21 in the input part adopts two No. 2 bearings 22 of the same structure, which are installed to the bearing bore 16g at an upper end of the upper shell 16 and the upper bearing bore 19e at an upper end of the upper cover 19. The No. 1 elastic collar for bore 13 is stuck in the groove 16h in the upper shell 16, so that an outer ring of the No. 2 bearing 22 at a left side is fastened into the bearing bore 16g of the upper shell 16. The No. 1 bearing end cover 20 is socketed to a slender shaft neck at a right end of the input shaft 21, and is engaged with the upper threaded bore 19d of the upper cover 19 by rotation. A left end face of the No. 1 bearing end cover 20 is connected to contact a right end face at an outer ring of the No. 2 bearing 22 at a right side, so as to provide axial positioning for the No. 2 bearing 22 at the right side.

As shown in FIG. 2, FIG. 6, FIG. 12, FIG. 17, and FIG. 18, the intermediate shaft 26 in the intermediate shaft part adopts two No. 3 bearings 24 of the same structure, which are installed to the bearing bore 16b at an intermediate position of the upper shell 16 and the lower bearing bore 19b of the upper cover 19. An outer ring of the No. 3 bearing 24 at a left side is installed to the bearing bore 16b of the upper shell 16, and a left end face of its outer ring is connected to contact a right end face of a flange at a left side of the bearing bore 16b of the upper shell 16 to provide axial positioning. An outer ring of the No. 3 bearing 24 at a right side is installed to the lower bearing bore 19b of the upper cover 19. The No. 2 bearing end cover 25 is engaged with the lower threaded bore 19a in the upper cover 19 by rotation. A left end face of the No. 2 bearing end cover 25 is connected to contact a right end face at an outer ring of the No. 3 bearing 24 at a right side, so as to provide axial positioning for the No. 3 bearing 24 at a right side. The No. 1 socket 27 is assembled to the involute spline shaft 26b of the intermediate shaft 26 between the No. 6 gear 23 and the No. 3 bearing 24 at a right side. A left end face of the No. 1 socket 27 is connected to contact a right end face of the No. 6 gear 23, and a right end face of the No. 1 socket 27 is connected to contact a left end face of the No. 3 bearing 2 at a right side.

As shown in FIG. 2, FIG. 8, FIG. 12, and FIG. 16, the pin gear rack hollow shaft 14 in the pin gear ring part adopts two No. 1 bearings 9 of the same structure, both of which are installed in the bearing bore 11d at a central position of the intermediate shell 11. An outer ring of two No. 1 bearings 9 of the same structure is connected with the bearing bore 11d by use of interference fit, and a right end face at an outer ring of the No. 1 bearing 9 at a right side is connected to contact a left end face of a flange at a right end of the bearing bore 11d of the intermediate shell 11 to provide axial positioning.

Figure 13:
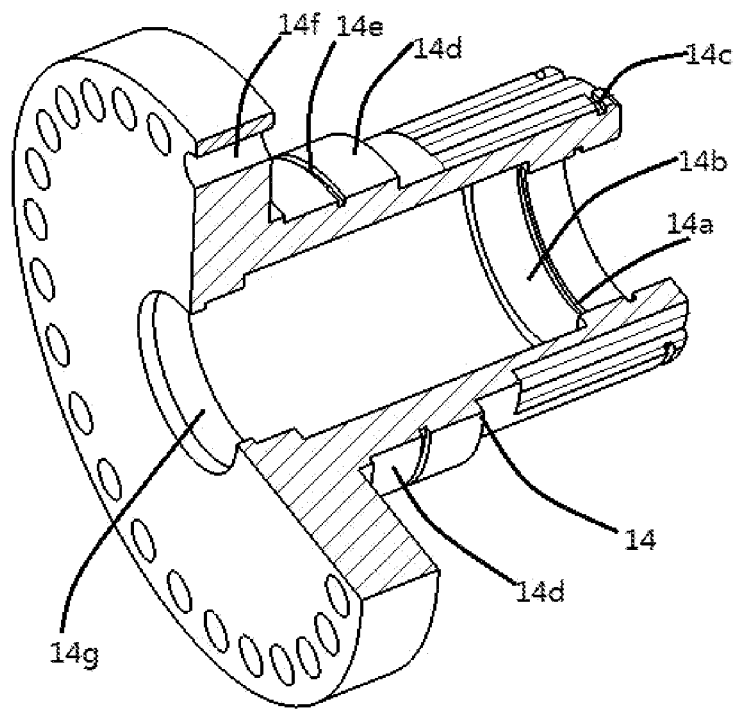
FIG. 13 is an axonometric projection illustrating a pin gear rack hollow shaft of the cycloidal-pin wheel type transmission mechanism for the automobile active steering system in the present invention.

As shown in FIG. 2, FIG. 7, and FIG. 13, the eccentric shaft 18 in the eccentric shaft part adopts two No. 4 bearings 32 of the same structure, which are installed to the bearing bore 14b, 14g at both sides of the middle unthreaded bore of the pin gear rack hollow shaft 14. An outer ring of the No. 4 bearing 32 at a left side is installed to the bearing bore 14g of the pin gear rack hollow shaft 14. A left end face at an outer ring of the No. 4 bearing 32 at a left side is connected to contact a right end face of an inner flange of the bearing bore 14g of the pin gear rack hollow shaft 14 to provide axial positioning, An outer ring of the No. 4 bearing 32 at a right side is installed to the bearing bore 14b of the pin gear rack hollow shaft 14. The No. 2 elastic collar for bore 17 is assembled in the groove 14a of the pin gear rack hollow shaft 14. A left end face of the No. 2 elastic collar for bore 17 is connected to contact a right end face at an outer ring of the No. 4 bearing 32 at a right side, so that the No. 4 bearing 32 at a right side is fastened into the bearing bore 14b of the pin gear rack hollow shaft 14.

As shown in FIG. 2, FIG. 9, FIG. 10, FIG. 12, FIG. 14, and FIG. 15, the output mechanism support shaft 46 in the output part adopts the No. 6 bearing 40 and the No. 7 bearing 44 which are installed to the bearing bore 4e of the lower shell 4 and the bearing bore 2b at a lower end of the valve body 2, respectively. A left end face at an outer ring of the No. 6 bearing 40 is connected to contact a right end face of an inner flange of the bearing bore 4e of the lower shell 4 to provide axial positioning. The No. 3 bearing end cover 45 is engaged with the threaded bore 2c of the valve body 2 by rotation. A right end face of the No. 3 bearing end cover 45 is connected to contact a left end face at an outer ring of the No. 7 bearing 44, so as to provide axial positioning for the No. 7 bearing 44.

All parts in the cycloidal-pin wheel type transmission mechanism 49 as described above are assembled in the following manner. Firstly, the assembling manner of each part shell is described.

As shown in FIG. 2, FIG. 5, FIG. 12, FIG. 17, and FIG. 18, the servo motor 28, the upper cover 19, and the upper shell 16 are connected together by three No. 2 internal hexagon socket head bolts 42 and No. 1 internal hexagon socket head bolts 29. In particular, one of the hexagon socket head bolts 42 passes through the upper one of two bolt bores 19c of the upper cover 19, and is connected with a front thread of three threaded bores 16e of the upper shell 16. Another hexagon socket head bolt 42 passes through a lower one of two bolt bores 19c of the upper cover 19, and is connected with a lower thread of three threaded bores 16e of the upper shell 16. A further one of the hexagon socket head bolts 42 passes through a lower one of two bolt bores 28a of the servo motor 28, and is connected with a thread of the threaded bore 19h of the upper cover 19. The No. 1 internal hexagon socket head bolt 29 passes through an upper one of two bolt bores 28a of the servo motor 28, passes through the bolt bore 19f of two bolt bores 19c of the upper cover 19, and is connected with a rear thread of three threaded bores 16e of the upper shell 16.

As shown in FIG. 2, FIG. 12, FIG. 16, and FIG. 17, the upper shell 16 and the intermediate shell 11 are connected together by three No. 2 internal hexagon socket head bolts 42. In particular, one of the hexagon socket head bolts 42 passes through a front one of three bolt bores 16f of the upper shell 16, and is connected with a front thread of three threaded bores 11a of the intermediate shell 11. Another hexagon socket head bolt 42 passes through a rear one of three bolt bores 16f of the upper shell 16, and is connected with a rear thread of three threaded bores 11a of the intermediate shell 11. A further hexagon socket head bolt 42 passes through a lower one of three bolt bores 16f of the upper shell 16, and is connected with a lower thread of three threaded bores 11a of the intermediate shell 11.

As shown in FIG. 2, FIG. 12, FIG. 15, and FIG. 16, the intermediate shell 11 and the lower shell 4 are connected together by three No. 2 internal hexagon socket head bolts 42. In particular, one of the hexagon socket head bolts 42 passes through a front one of three bolt bores 4a of the lower shell 4, and is connected with a front thread of three threaded bores 11b of the intermediate shell 11. Another hexagon socket head bolt 42 passes through a rear one of three bolt bores 4a of the lower shell 4, and is connected with a rear thread of three threaded bores 11b of the intermediate shell 11. A further one of the hexagon socket head bolts 42 passes through a lower one of three bolt bores 4a of the lower shell 4, and is connected with a lower thread of three threaded bores 11b of the intermediate shell 11.

As shown in FIG. 2, FIG. 12, FIG. 14, and FIG. 15, the lower shell 4 and the valve body 2 are connected together by three No. 2 internal hexagon socket head bolts 42. In particular, one of the hexagon socket head bolts 42 passes through a front one of three bolt bores 2d of the valve body 2, and is connected with a front thread of three threaded bores 4b of the lower shell 4. Another hexagon socket head bolt 42 passes through a rear one of three bolt bores 2d of the valve body 2, and is connected with a rear thread of three threaded bores 4b of the lower shell 4. A further one of the hexagon socket head bolts 42 passes through a lower one of three bolt bores 2d of the valve body 2, and is connected with a lower thread of three threaded bores 4b of the lower shell 4.

As shown in FIG. 1, FIG. 2, FIG. 12, and FIG. 14, the valve body 2 and the steering box shell of the steering box 51 are connected together by three No. 2 internal hexagon socket head bolts 42, and an upper end face of the steering box shell of the steering box 51 is provided with three threaded bores corresponding to three bolt bores 2e of the valve body 2. In particular, one of the hexagon socket head bolts 42 passes through a front one of three bolt bores 2e of the valve body 2, and is connected with a thread of a corresponding threaded bore among three threaded bores of the steering box shell of the steering box 51. Another hexagon socket head bolt 42 passes through a rear one of three bolt bores 2e of the valve body 2, and is connected with a thread of a corresponding threaded bore among three threaded bores of the steering box shell of the steering box 51. A further one of the hexagon socket head bolts 42 passes through a lower one of three bolt bores 2e of the valve body 2, and is connected with a thread of a corresponding threaded bore among three threaded bores of the steering box shell of the steering box 51.

Secondly, the relative position relationship among parts in the cycloidal-pin wheel type transmission mechanism 49 is described hereinafter.

The No. 1 gear 12 of the input part extends into a circular-arc-shaped boss internal chamber at an upper portion of a right internal chamber 11c of the intermediate shell 11. The input shaft 21 of the input part passes through the upper bearing bore 19e of the upper cover 19 and the upper bore 16c of the upper shell 16, and then extends deeply into the circular-arc-shaped boss internal chamber at an upper portion of the right internal chamber 11c of the intermediate shell 11. An output shaft of the servo motor 28 of the servo motor part passes through the rear upper bore 19g of the upper cover 19, and extends deeply into the right upper internal chamber 16d of the upper shell 16. The No. 5 gear 30 of the servo motor 28 extends into the right upper internal chamber 16d of the upper shell 16. The No. 6 gear 23 of the intermediate shaft 26 of the intermediate shaft part extends into the right lower internal chamber 16a of the upper shell 16. The intermediate shaft 26 is supported in the lower bearing bore 19b of the upper cover 19 and the bearing bore 16b of the upper shell 16. The No. 2 gear 33 of the pin gear ring part extends deeply inside the right internal chamber 11c of the intermediate shell 11. The electromagnetic clutch 31 extends into the left lower bore 16i of the upper shell 16. A left end flange of the pin gear rack hollow shaft 14, the supporting ring 7, the pin gear 8 and the cycloidal wheel 39 of the pin gear ring part, as well as a right end flange of the output mechanism support shaft 46, the cylindrical pins 38, the cylindrical pin sleeves 37 of the output part, are installed to the left internal chamber 11e of the intermediate shell 11. Eight cylindrical pin sleeves 37 of the same structure of the output part are assembled with eight cylindrical pins 38 of the same structure, respectively, and then installed to eight cylindrical pin bores 39c of the cycloidal wheel 39 of the eccentric shaft part, and the No. 4 gear 41 of the output part extends into the large internal chamber 4d of the lower shell 4. The No. 3 gear 3 of steering pinion shaft part extends into the small internal chamber 4c of the lower shell 4.

The No. 1 gear 12 of the input part is engaged with the No. 2 gear 33 of the pin gear ring part by external toothing, and the No. 5 gear 30 at an output end of the servo motor 28 of the servo motor part is engaged with the No. 6 gear 23 of the intermediate shaft part by external toothing. The involute spline shaft section at a left end of the intermediate shaft 26 is connected with an input end of the electromagnetic clutch 31 by an involute spline pair, and the involute spline shaft section at a right end of the eccentric shaft 18 is connected with an output end of the electromagnetic clutch 31 by an involute spline pair. The No. 3 gear 3 of the output part is engaged with the No. 4 gear 41 of the output part by external toothing, and the cycloidal wheel 39 of the eccentric shaft part is engaged with twenty-six pin gears 8 of the same structure which are uniformly arranged the circumference of the pin gear ring part.

The automobile active steering system the present invention operates under the following principle.

In the automobile active steering system, the cycloidal-pin wheel type transmission mechanism 49 has two input ends which are independent from each other, and a common output end. One of the input ends is controlled by an input from the steering hand wheel 47, and the other input end is controlled by an input from the motor 28. The output end is connected with the steering box 51. The power is transmitted in the following two routes.

Route 1: the steering hand wheel 47-the steering column 48-the input shaft 21-the No. 1 gear 12-the No. 2 gear 33-the pin gear rack hollow shaft 14-the pin gear 8-the cycloidal wheel 39-the cylindrical pin sleeves 37-the cylindrical pins 38-the output mechanism support shaft 46-the No. 4 gear 41-the No. 3 gear 3-the spool 60-the torsion bar 61-the steering pinion shaft 1-the steering box 51.

Route 2: the motor 28-the No. 5 gear 30-the No. 6 gear 23-the intermediate shaft 26-the electromagnetic clutch 31-the eccentric shaft 18-the No. 5 bearing 36-the cycloidal wheel 39-the cylindrical pin sleeves 37-the cylindrical pins 38-the output mechanism support shaft 46-the No. 4 gear 41-the No. 3 gear 3-the spool 60-the torsion bar 61-the steering pinion shaft 1-the steering box 51.

In order to save the power consumption during normal operation, the electromagnetic clutch 31 adopts a breakdown electromagnetic clutch. When the motor 28 operates normally, the electromagnetic clutch 31 is de-energized to close, so that the intermediate shaft 26 and the eccentric shaft 18 is connected as an integral piece. When only route 1 operates, the motor 28 follows freely, because the cycloidal wheel 39 has a counterforce against the pin gear 8, and the counterforce will act on the steering hand wheel 47 to disturb the driver. When the motor 28 breaks down, the electromagnetic clutch 31 is energized to disconnect, and route 1 can still operate in this case without being affected by the failure of the motor.

By modifying the number of teeth of the No. 1 gear 12 and the No. 2 gear 33, the number of teeth of the No. 3 gear 3 and the No. 4 gear 41, the number of teeth of the No. 5 gear 30 and the No. 6 gear 23, the number of teeth of the cycloidal wheel 39 of the cycloidal-pin wheel type transmission mechanism and the pin gear 8, it is possible to obtain different values of transmission ratio between the input end and the output end of steering wheel, and between the input end and the output end of the motor.

As can be seen from the above analysis, the automobile active steering system can realize steering in an active manner. The newly added freedom controlled by the motor can provide a superimposed steering angle for the steering box. As a result, when the motor breaks down, the electromagnetic clutch automatically interrupt the connection, so that the steering hand wheel can directly provide input to the steering box and thus control the automobile steering. Namely, a novel, reliable, and compact steering system is provided.

Although the present invention has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

What is claimed is:

1. An automobile active steering system with a cycloidal-pin wheel mechanism, characterized in that, the automobile active steering system comprises:
   a steering hand wheel (47),
   a steering shaft (52),
   a No. 1 universal joint (53),
   a steering transmission shaft (48),
   a No. 2 universal joint (54),
   a cycloidal-pin wheel transmission mechanism (49),
   a rotary hydraulic valve (50), and
   a steering box (51);
   wherein the steering hand wheel (47) is connected with an upper end of the steering shaft (52) by use of a spline pair, a lower end of the steering shaft (52) is connected with an upper end of the steering transmission shaft (48) by use of the No. 1 universal joint (53), the other end of the steering transmission shaft (48) is connected with a right end of an input shaft (21) in the cycloidal-pin wheel transmission mechanism (49) by use of the No. 2 universal joint (54), a No. 3 gear (3) of the cycloidal-pin wheel transmission mechanism (49) is connected with a right end of a steering pinion shaft (1) of the rotary hydraulic valve (50) by use of a spline pair, and a steering pinion (1e) of the steering pinion shaft (1) is engaged with a rack part of the steering box (51).

2. The automobile active steering system of claim 1, characterized in that, the steering hand wheel (47) is a three-spoke or four-spoke steering wheel; the steering transmission shaft (48) comprises a tube with internal splines and a shaft with external splines which are assembled together, and the tube with internal splines and the shaft with external splines are connected in a sliding manner;
   the rotary hydraulic valve (50) comprises a valve body (2) and a steering pinion part, and the steering pinion part comprises the steering pinion shaft (1); and
   an upper end of a valve body (2) is provided with a pinion shaft bore (2a) for installing the steering pinion shaft (1); a lower end of the valve body (2) is provided with a bearing bore (2b) for installing a No. 7 bearing (44), a left end of the bearing bore (2b) is provided with a threaded bore (2c) for installing a No. 3 bearing end cover (45), a revolving axis of the bearing bore (2b) for installing the No. 7 bearing (44) is collinear with that of the threaded bore (2c) for installing the No. 3 bearing end cover (45), a revolving axis of a pinion shaft bore (2a) is parallel with that of the bearing bore (2b) for installing the No. 7 bearing, three bores (2e) of the same structure for installing bolts are uniformly arranged in a left end face of the valve body (2), three bolt bores (2d) of the same structure for installing bolts are uniformly arranged in a right end face of the valve body (2), and the steering pinion shaft (1) is installed to and rotationally connected with the pinion shaft bore (2a) at an upper end of the valve body (2).

3. The automobile active steering system of claim 1, characterized in that, the cycloidal-pin wheel transmission mechanism (49) comprises an input part, a servo motor part, an intermediate shaft part, an eccentric shaft part, a pin gear ring part, an output part, a shell part, and an electromagnetic clutch (31);

the shell part comprises the valve body (2), a lower shell (4), an intermediate shell (11), an upper shell (16), an upper cover (19), a No. 1 bearing end cover (20), a No. 2 bearing end cover (25), and a No. 3 bearing end cover (45);

the valve body (2), the lower shell (4), the intermediate shell (11), the upper shell (16), and the upper cover (19) are successively connected and fastened by bolts, the No. 1 bearing end cover (20) is connected with a thread of an upper threaded bore (19d) of the upper cover (19), the No. 2 bearing end cover (25) is connected with a thread of a lower threaded bore (19a) of the upper cover (19), the No. 3 bearing end cover (45) is connected with a thread of the threaded bore (2c) of the valve body (2);

the input shaft (21) of the input part is installed to a bearing bore (16g) at an upper end of the upper shell (16) and an upper bearing bore (19e) at an upper end of the upper cover (19) by use of two No. 2 bearings (22) of the same structure, an intermediate shaft (26) of the intermediate shaft part is installed to a bearing bore (16b) at an intermediate position of the upper shell (16) and a lower bearing bore (19b) of the upper cover (19) by use of two No. 3 bearings (24) of the same structure, the servo motor part is installed to a right end face of a rear upper bore (19g) of the upper cover (19) by use of a shell in a servo motor (28), a No. 5 gear (30) of the servo motor part is engaged with a No. 6 gear (23) of the intermediate shaft part, the pin gear ring part is installed to a bearing bore (11d) of the intermediate shell (11) by use of a pin gear rack hollow shaft (14) in the pin gear ring part and two No. 1 bearings (9) of the same structure, a No. 2 gear (33) which is installed to a right end of the pin gear rack hollow shaft (14) is engaged with a No. 1 gear (12) of the input part, a No. 1 bearing bore (14b) and a No. 2 bearing bore (14g) are installed to the pin gear rack hollow shaft (14) by use of an eccentric shaft (18) in the eccentric shaft part and two No. 4 bearings (32) of the same structure and are rotationally connected with each other, the output part is installed to a bearing bore (4e) of the lower shell (4) and a bearing bore (2b) at a lower end of the valve body (2) by use of an output mechanism support shaft (46) in the output part, a No. 6 bearing (40), and a No. 7 bearing (44), the output mechanism support shaft (46) is engaged with a cylindrical pin (38) and a cycloidal wheel (39) of the eccentric shaft part by use of a cylindrical pin sleeve (37), the electromagnetic clutch (31) is connected between the eccentric shaft (18) of the eccentric shaft part and the intermediate shaft (26) of the intermediate shaft part, a steering pinion shaft part is installed to the pinion shaft bore (2a) at an upper end of the valve body (2) by use of the steering pinion shaft (1) and is rotationally connected with the pinion shaft bore (2a), and the No. 3 gear (3) and a No. 4 gear (41) of the output part are engaged with each other; and the eccentric shaft (18) is a rod structural member, the eccentric shaft (18) comprises a right section shaft, a No. 1 shaft neck (18a), a middle unthreaded shaft, a No. 2 shaft neck (18b), and an eccentric unthreaded shaft neck (18c) which are successively and integrally connected, a left end of the eccentric unthreaded shaft neck (18c) is provided with a stopping slot, revolving axes of the right section shaft, the No. 1 shaft neck (18a), the middle unthreaded shaft, and the No. 2 shaft neck (18b) are collinear with each other, a revolving axis of the eccentric unthreaded shaft neck (18c) is parallel with that of the No. 2 shaft neck (18b), and an eccentric distance between revolving axes of the eccentric unthreaded shaft neck and the No. 2 shaft neck is 1 mm.

4. The automobile active steering system of claim 3, characterized in that, the pin gear rack hollow shaft (14) is a rotary body comprising a flange plate at a left end and a cylinder at a right end which are integrally assembled, revolving axes of the flange plate and the cylinder are collinear with each other, twenty-six pin gear bores (14f) of the same structure are uniformly arranged in the flange plate for installing pin gears (8), two No. 1 unthreaded shaft necks (14d) of the same structure and a spline shaft section are successively arranged on a cylinder outer circumferential face at a right side of the flange plate, a No. 1 groove (14e) is arranged between two No. 1 unthreaded shaft necks (14d) of the same structure, a shoulder is arranged at a left end of the No. 1 shaft neck (14d) at a left end, a No. 2 groove (14c) is arranged at a right end of the spline shaft section; a stepped bore is arranged at a center of the cylinder, the No. 1 bearing bore (14b), a middle unthreaded bore, and the No. 2 bearing bore (14g) are arranged successively from right to left; the No. 1 bearing bore (14b) and the No. 2 bearing bore (14g) are of the same diameter, a groove (14a) is arranged in a right inner wall of the No. 1 bearing bore (14b), the middle unthreaded bore has a diameter larger than that of the No. 1 bearing bore (14b) and the No. 2 bearing bore (14g), and an in-bore positioning convex shoulder is arranged at a left end of the No. 2 bearing bore (14g).

5. The automobile active steering system of claim 3, characterized in that, the pin gear ring part further comprises a supporting ring (7), twenty-six pin gears (8) of the same structure, a No. 1 elastic collar for shaft (15), and a No. 2 elastic collar for shaft (34);

the pm gear (8) comprises a left small-diameter section and a right large-diameter section, the right large-diameter section is an unthreaded shaft, a left section of the left small-diameter section is provided with external threads, a right section of the left small-diameter section is an unthreaded shaft neck, and a chamfer is arranged between the left small-diameter section and the right large-diameter section; and large end unthreaded shafts of twenty-six pin gears (8) of the same structure are successively installed to twenty-six pin gear bores (14f) which are uniformly arranged on a large disc end of the pin gear rack hollow shaft (14) by use of interference fit, twenty-six bores in the supporting ring (7) which are aligned with twenty-six pin gear bores (14f) in the large disc end are assembled to small end unthreaded shaft necks at a left section of twenty-six pin gears (8), respectively, a right end face of the supporting ring (7) is connected to contact the chamfer between small end shaft necks at a left section of twenty-six pin gears (8) of the same structure and large end shaft necks of the pin gears (8), thirteen nuts of the same structure are alternately installed to a small end of thirteen pin gears (8) among the twenty-six pin gears (8) of the same structure by use of threads, the No. 1 bearing (9) at a left side is assembled to a left side of the No. 1 shaft neck (14d) of the pin gear rack hollow shaft (14), a left end face at an inner ring of the No. 1 bearing (9) at a left side is connected to contact a right end face of a left side shoulder of the No. 1 shaft neck (14d), the No. 2 elastic collar for shaft (34) is assembled to the No. 1 groove (14e) of the pin gear rack hollow shaft (14), the No. 1 bearing (9) at a right side is assembled to a right end the No. 1 shaft neck (14d) of the pin gear rack hollow shaft (14), the No. 2 gear (33) is assembled to an involute spline shaft of the pin gear rack hollow shaft (14), the No. 1 elastic collar for shaft (15) is installed to the No. 2 groove (14c) of the pin gear rack hollow shaft (14) at a right side of the No. 2 gear (33), and the No. 2 elastic collar for shaft (34) is assembled to the No. 1 groove (14e) of the pin gear rack hollow shaft (14).

6. The automobile active steering system of claim 4, characterized in that, the output part further comprises eight cylindrical pin sleeves (37) of the same structure, eight cylindrical pins (38) of the same structure, the No. 6 bearing (40), the No. 4 gear (41), the No. 3 gear (3), a No. 1 shaft end collar (5), a No. 1 screw (58), a No. 2 socket (43), the No. 7 bearing (44), and the output mechanism support shaft (46);

left ends of eight cylindrical pins (38) of the same structure are successively installed to eight cylindrical pin bores (46a) which are uniformly arranged in the flange plate at a large end of the output mechanism support shaft (46) by use of interference fit, eight cylindrical pin sleeves (37) of the same structure are successively assembled to eight cylindrical pins (38) of the same structure by use of clearance fit, the No. 6 bearing (40) is assembled to the No. 1 shaft neck (46b) of the output mechanism support shaft (46) by use of interference fit, a right end face at an inner ring of the No. 6 bearing (40) is connected to contact a shoulder at a right side of the No. 1 shaft neck (46b) of the output mechanism support shaft (46), a left end face at an outer ring of the No. 6 bearing (40) is connected to contact a right end face of an inner flange of the bearing bore (4e) of the lower shell (4), the No. 4 gear (41) is assembled to the spline shaft of the output mechanism support shaft (46) by use of a spline pair, the No. 2 socket (43) is assembled to the spline shaft at a left side of the No. 4 gear (41) bu use of clearance fit, a right end face of the No. 4 gear (41) contacts the spline groove end face of the involute spline shaft, a right end face of the No. 2 socket (43) is connected to contact a left end face of the No. 4 gear (41), the No. 7 bearing (44) is assembled to the No. 2 shaft neck (46c) of the output mechanism support shaft (46), a right end face at an inner ring of the No. 7 bearing (44) is connected to contact a left end face if the No. 2 socket (43), and a left end face at an outer ring of the No. 7 bearing (44) is connected to contact a right end face of the No. 3 bearing end cover (45).

7. An automobile active steering system with a cycloidal-pin wheel component, characterized in that, comprises:
 a steering wheel;
 a steering driving component, which is connected with the steering wheel for transmitting a steering angle of the steering wheel;
 a servo motor driving component, which is capable of providing an additional steering angle;
 a cycloidal-pin wheel component, which is capable of receiving the steering angle transmitted by the steering driving mechanism and the additional steering angle provided by the servo motor driving component, so that the steering angle transmitted by the steering driving component and the additional steering angle provided by the servo motor driving component are superimposed and then output; and a clutch, which selectively connects the servo motor driving component with the cycloidal-pin wheel component,
 wherein the steering driving component comprises a steering shaft, a No. 1 universal joint, a steering transmission shaft, a No. 2 universal joint which are successively connected, wherein the No. 2 universal joint is connected with an input shaft of a cycloidal-pin wheel transmission component; and
 wherein the steering transmission shaft comprises a tube and a shaft sleeve which are engaged by spline and are slidable with respect to each other to modify a length of the steering transmission shaft.

8. The automobile active steering system of claim 7, characterized in that, the cycloidal-pin wheel transmission component further comprises:
 an input shaft, which is connected with the steering driving component and receives a steering angle output by the steering wheel;
 a cycloidal-pin wheel reducer, which is connected with the input shaft, receives the steering angle transmitted by the input shaft, and outputs the steering angle;
 wherein the clutch is arranged between the servo motor driving component and the cycloidal-pin wheel reducer, and the clutch selectively transmits the steering angle output by the servo motor driving component to the cycloidal-pin wheel reducer.

9. The automobile active steering system of claim 8, characterized in that, the servo motor driving component comprises:
 a servo motor;
 a No. 5 gear which is connected with the servo motor, wherein revolving axes of the No. 5 gear and the servo motor are coaxial;
 an intermediate shaft and a No. 6 gear, wherein revolving axes of the intermediate shaft and the No. 6 gear are coaxial, and the No. 5 gear is engaged with the No. 6 gear to transmit the steering angle output by the servo motor to the intermediate shaft.

10. The automobile active steering system of claim 9, characterized in that, the cycloidal-pin wheel reducer comprises:
 an eccentric shaft;
 a cycloidal wheel, which is connected with an end of the eccentric shaft in a coaxial manner, wherein the cycloidal wheel is driven by the eccentric shaft to rotate eccentrically, and the cycloidal wheel is provided with cylindrical pin bores;
 a pin gear rack hollow shaft, which is of a hollow configuration;
 pin gears, which are arranged on the pin gear rack hollow shaft in a circular manner, wherein the cycloidal wheel is engaged with the pin gears; and
 an output mechanism support shaft, which is provided with cylindrical pins and cylindrical pin sleeves, wherein the cylindrical pins and cylindrical pin sleeves are engaged with the cylindrical pin bores, and the cycloidal wheel eccentric rotates to drive the output mechanism support shaft to rotate around its axis;
 wherein the pin gear rack hollow shaft is connected with the input shaft, receives the steering angle output by the input shaft, and transmits the steering angle to the output mechanism support shaft; and
 wherein the eccentric shaft can receive the steering angle transmitted by the servo motor driving mechanism via the clutch and transmit the steering angle to the output mechanism support shaft.

11. The automobile active steering system of claim 10, characterized in that, the pin gear rack hollow shaft and the input shaft are driven by use of a pair of No. 1 gear and No. 2 gear which are engaged with each other, the No. 1 gear and the input shaft are connected in a coaxial manner, and the No. 2 gear and the pin gear rack hollow shaft are connected in a coaxial manner.

12. The automobile active steering system of claim 11, characterized in that, the automobile active steering system further comprises a rotary hydraulic valve and a steering box, wherein the rotary hydraulic valve is installed between the cycloidal-pin wheel reducer and the steering box, so that the cycloidal-pin wheel reducer transmits the steering angle output by the output mechanism support shaft to the steering box for steering wheels;
  the rotary hydraulic valve comprises:
  a valve body;
  a steering pinion shaft, which is provided with four bosses, wherein the bosses are provided with an angular groove, a valve pocket gasket is installed in the angular groove, and once the steering pinion shaft is inserted into the valve body, the valve pocket gasket is compressed to deform and closely fit to a valve body inner wall to provide sealing;
  a torsion bar, which is inserted into an axial empty chamber of the steering pinion shaft, and is fastened to the steering pinion shaft by use of valve pocket positioning pins;
  a spool, which is fastened to the torsion bar by use of a spool positioning pin;
  wherein the spool and the output mechanism support shaft are driven by a pair of No. 3 gear and No. 4 gear which are engaged with each other, wherein the No. 3 gear and the spool are connected in a coaxial manner, and the No. 4 gear and the output mechanism support shaft are connected in a coaxial manner; and
  the steering pinion shaft is provided with tooth shaped sections, wherein the steering box comprises a steering box rack, and tooth shaped sections of the pinion shaft are engaged with the steering box rack to drive the steering box rack to move to left and/or right, thus steering the wheels.

13. An automobile active steering system with a cycloidal-pin wheel component, characterized in that, the automobile active steering system comprises:
  a steering wheel;
  a steering driving component, which is connected with the steering wheel for transmitting a steering angle of the steering wheel;
  a cycloidal-pin wheel transmission component, which is connected with the steering driving component, and receives the steering angle transmitted by the steering driving component; and
  a steering box, which is connected with the cycloidal-pin wheel transmission component, receives a steering angle output by the cycloidal-pin wheel transmission component, and steers the wheels;
  wherein the cycloidal-pin wheel transmission component is further capable of applying an additional steering angle, and the additional steering angle is superimposed on the steering angle transmitted by the steering driving component for outputting,
  wherein the steering driving component comprises a steering shaft, a No. 1 universal joint, a steering transmission shaft, a No. 2 universal joint which are successively connected, wherein the No. 2 universal joint is connected with an input shaft of the cycloidal-pin wheel transmission component;
  the steering transmission shaft comprises a tube and a shaft sleeve which are engaged by spline and are slidable with respect to each other to modify a length of the steering transmission shaft.

14. The automobile active steering system of claim 13, characterized in that, the cycloidal-pin wheel transmission component comprises:
  an input shaft, which is connected with the steering driving component and receives the steering angle output by the steering wheel;
  a servo motor driving component, which is capable of providing an additional steering angle;
  a cycloidal-pin wheel reducer, which is connected with the input shaft, receives the steering angle transmitted by the input shaft, and outputs the steering angle; and
  a clutch, which is arranged between the servo motor driving component and the cycloidal-pin wheel reducer, wherein the clutch selectively transmits the steering angle output by the servo motor driving component to the cycloidal-pin wheel reducer.

15. The automobile active steering system of claim 14, characterized in that, the servo motor driving component comprises:
  a servo motor;
  a No. 5 gear which is connected with the servo motor, wherein revolving axes of the No. 5 gear and the servo motor are coaxial; and
  an intermediate shaft and a No. 6 gear, wherein the intermediate shaft and the No. 6 gear are connected in a coaxial manner, and the No. 5 gear is engaged with the No. 6 gear to transmit the steering angle output by the servo motor to the intermediate shaft.

16. The automobile active steering system of claim 15, characterized in that, the cycloidal-pin wheel reducer comprises:
  an eccentric shaft;
  a cycloidal wheel, which is connected with an end of the eccentric shaft in a coaxial manner, wherein the cycloidal wheel is driven by the eccentric shaft to rotate eccentrically, and the cycloidal wheel is provided with cylindrical pin bores;
  a pin gear rack hollow shaft, which is of a hollow configuration;
  pin gears, which are arranged on the pin gear rack hollow shaft in a circular manner, wherein the cycloidal wheel is engaged with the pin gears;
  an output mechanism support shaft, which is provided with cylindrical pins and cylindrical pin sleeves, wherein the cylindrical pins and cylindrical pin sleeves are engaged with the cylindrical pin bores, and the cycloidal wheel eccentric rotates to drive the output mechanism support shaft to rotate around its axis;
  wherein the pin gear rack hollow shaft is connected with the input shaft, receives the steering angle output by the input shaft, and transmits the steering angle to the output mechanism support shaft; and
  the eccentric shaft can receive the steering angle transmitted by the servo motor driving mechanism via the clutch and transmit the steering angle to the output mechanism support shaft.

17. The automobile active steering system of claim 16, characterized in that, the pin gear rack hollow shaft and the input shaft are driven by use of a pair of No. 1 gear and No. 2 gear which are engaged with each other, the No. 1 gear and the input shaft are connected in a coaxial manner, and the No. 2 gear and the pin gear rack hollow shaft are connected in a coaxial manner.

18. The automobile active steering system of claim 17, characterized in that, the automobile active steering system further comprises a rotary hydraulic valve, wherein the rotary hydraulic valve is installed between the cycloidal-pin wheel reductor and the steering box, so that the cycloidal-pin wheel reductor transmits the steering angle output by the output mechanism support shaft to the steering box for steering wheels;

the rotary hydraulic valve comprises:

a valve body;

a steering pinion shaft, which is provided with four bosses, the bosses are provided with an angular groove, a valve pocket gasket is installed in the angular groove, and once the steering pinion shaft is inserted into the valve body, the valve pocket gasket is compressed to deform and closely fit to a valve body inner wall to provide sealing;

a torsion bar, which is inserted into an axial empty chamber of the steering pinion shaft, and is fastened to the steering pinion shaft by use of valve pocket positioning pins;

a spool, which is fastened to the torsion bar by use of a spool positioning pin;

wherein the spool and the output mechanism support shaft are driven by a pair of No. 3 gear and No. 4 gear which are engaged with each other, wherein the No. 3 gear and the spool are connected in a coaxial manner, and the No. 4 gear and the output mechanism support shaft are connected in a coaxial manner; and the steering pinion shaft is provided with tooth shaped sections, wherein the steering box comprises a steering box rack, and tooth shaped sections of the pinion shaft are engaged with the steering box rack to drive the steering box rack to move to left and/or right, thus steering the wheels.

* * * * *